United States Patent
Lefebvre et al.

(10) Patent No.: US 11,075,812 B2
(45) Date of Patent: Jul. 27, 2021

(54) SERVER AND METHODS FOR SYNCHRONIZING NETWORKING INFORMATION WITH CLIENT DEVICES

(71) Applicant: KALOOM INC., Montreal (CA)

(72) Inventors: Geoffrey Lefebvre, Montreal (CA); Daniel Richer, Boucherville (CA); Harsimrandeep Singh Pabla, Ottawa (CA)

(73) Assignee: KALOOM INC., Montreal (CA)

( * ) Notice: Subject to any disclaimer, the term of this patent is extended or adjusted under 35 U.S.C. 154(b) by 51 days.

(21) Appl. No.: 16/446,789

(22) Filed: Jun. 20, 2019

(65) Prior Publication Data

US 2020/0403874 A1   Dec. 24, 2020

(51) Int. Cl.
| | |
|---|---|
| *H04L 12/24* | (2006.01) |
| *H04L 29/12* | (2006.01) |
| *H04L 29/06* | (2006.01) |
| *G06F 16/178* | (2019.01) |

(52) U.S. Cl.
CPC ............ *H04L 41/12* (2013.01); *G06F 16/178* (2019.01); *H04L 61/2007* (2013.01); *H04L 67/42* (2013.01); *H04L 61/6022* (2013.01)

(58) Field of Classification Search
CPC ... G06F 16/178; H04L 41/12; H04L 61/2007; H04L 61/6022; H04L 67/42
See application file for complete search history.

(56) References Cited

U.S. PATENT DOCUMENTS

| | | | |
|---|---|---|---|
| 4,827,411 A | 5/1989 | Arrowood et al. | |
| 5,101,348 A | 3/1992 | Arrowood et al. | |
| 7,512,703 B2* | 3/2009 | Ho | H04L 41/12 |
| | | | 709/238 |
| 7,606,175 B1 | 10/2009 | Maufer | |
| 8,291,036 B2* | 10/2012 | Poluri | G06F 11/2066 |
| | | | 709/217 |
| 8,358,595 B2 | 1/2013 | Georgel et al. | |
| 9,098,344 B2* | 8/2015 | Chandramouli | H04L 47/70 |
| 9,954,723 B2 | 4/2018 | Janardhanan et al. | |
| 10,055,423 B2* | 8/2018 | Sagar | H04L 67/2823 |
| 10,630,556 B2* | 4/2020 | Langston | H04L 67/26 |
| 2008/0159291 A1 | 7/2008 | Sultan et al. | |
| 2009/0198702 A1* | 8/2009 | Novik | G06F 16/178 |
| 2011/0029882 A1* | 2/2011 | Jaisinghani | H04L 41/12 |
| | | | 715/736 |

(Continued)

*Primary Examiner* — Thomas J Dailey
(74) *Attorney, Agent, or Firm* — IP Delta Plus Inc.

(57) ABSTRACT

Server and methods for performing synchronization and resynchronization of networking information with client devices. During standard operations, client networking data discovered by a given client device are received by the server from the given client device, stored by the server, and forwarded by the server to other client devices. Client networking data from the other client devices received and stored by the server are forwarded to the given client device. Upon occurrence of a pre-defined event at the given client device preventing exchange of information between the given client device and the server, a resynchronization of the client networking data is performed between the given client device and the server. The synchronization and resynchronization mechanisms are based on unique version numbers respectively generated by the server and the given client device.

18 Claims, 17 Drawing Sheets

(56) References Cited

U.S. PATENT DOCUMENTS

| | | | |
|---|---|---|---|
| 2013/0226876 A1* | 8/2013 | Gati | G06F 16/119 |
| | | | 707/652 |
| 2014/0279901 A1* | 9/2014 | Agrawal | G06F 16/182 |
| | | | 707/634 |
| 2014/0337291 A1* | 11/2014 | Dorman | G06F 16/1844 |
| | | | 707/634 |
| 2015/0092606 A1 | 4/2015 | Kelsey et al. | |
| 2016/0080196 A1 | 3/2016 | Narasimhan et al. | |
| 2016/0088093 A1 | 3/2016 | Yung et al. | |
| 2016/0094398 A1 | 3/2016 | Choudhury et al. | |
| 2017/0091258 A1 | 3/2017 | Rajahalme | |
| 2018/0367449 A1 | 12/2018 | Pani et al. | |
| 2020/0204489 A1 | 6/2020 | Pianigiani et al. | |

* cited by examiner

SERVER AND METHODS FOR SYNCHRONIZING NETWORKING INFORMATION WITH CLIENT DEVICES

TECHNICAL FIELD

The present disclosure relates to the field of data centers. More specifically, the present disclosure relates to a server and methods for synchronizing networking information with client devices.

BACKGROUND

Recent years have seen an increasing development of technologies such as Software as a Service (SaaS), cloud computing, etc. This development is fueled by a growing customer demand for products and services based on these types of technologies. This development is also fueled by constant progresses in underlying technologies, such as processing power increase for microprocessors, storage capacity increase for storage devices, and transmission capacity improvements for networking equipment. Furthermore, the average cost of these underlying technologies is falling. However, the decrease in the average cost of the underlying technologies is balanced by the increased customer demand, which requires to constantly update and upgrade the infrastructures used for providing SaaS or cloud computing.

The infrastructure used for providing SaaS or cloud computing is a data center, which combines a very large number of computing servers. Each server has a plurality of multi-core processors, and the combination of the computing servers provides a very high processing capacity, which is used by customers of the data center. Some or all of the servers may also have important storage capacities, so that the combination of the servers also provides a very high storage capacity to the customers of the data center. The data center also relies on a networking infrastructure, for interconnecting the servers and providing access to their computing and/or storage capacity to the customers of the data center. In order to provide a reliable service, very strong requirements in terms of scalability, manageability, fault-tolerance, etc., are imposed on the computing and networking infrastructure of the data center.

With respect to the networking infrastructure of the data center, it is well known that providing efficient and reliable networking services to a very large number of hosts is a complex task. Solutions and technologies have been developed in other contexts, such as networking technologies for providing mobile data services to a very large number of mobile devices. Some of these technologies have been standardized in dedicated instances, such as the Internet Engineering Task Force (IETF®) or the 3rd Generation Partnership Project (3GPP™). However, at least some of the technological challenges of deploying an efficient and reliable networking infrastructure in a data center are specific to the data center context; and need to be addressed with original solutions and technologies.

The networking infrastructure of a data center relies on one or more fabric. Each fabric comprises a plurality of networking equipment providing internal and external networking capabilities to computing servers of the data center. At least some of the networking equipment of the fabric are capable of discovering networking information related to some of their neighbors. Such networking information include, for example, a Media Access Control (MAC) address and/or an Internet Protocol (IP) address of a plurality of neighbors. The networking equipment further share the discovered networking information between each other, so that each networking equipment involved in the process benefits from the networking information discovered from peer networking equipment. The networking information is used by a networking equipment for forwarding packets through the networking infrastructure of the fabric.

Maintaining a synchronization of the networking information discovered and exchanged by the various networking equipment involved in the process is a complex task. One way to improve the efficiency and resiliency of the synchronization is to use a centralized server dedicated to the collection and dissemination of the networking information among the plurality of networking equipment.

Therefore, there is a need for a server and methods for synchronizing networking information with client devices.

SUMMARY

According to a first aspect, the present disclosure relates to a server. The server comprises memory, a communication interface, and a processing unit. The memory stores a global topology table comprising a plurality of entries. Each entry comprises client networking data, a unique client identifier of one among a plurality of clients, and a unique server version number. The server version numbers increase from a first value corresponding to a first entry in the global topology table to a last value S1 corresponding to a last entry in the global topology table. The memory also stores a client version table comprising one entry for each one among the plurality of clients. Each entry comprises the unique client identifier of one among the plurality of clients and a corresponding client version number. The processing unit receives from a given client among the plurality of clients via the communication interface a client synchronization message. The client synchronization message comprises the client identifier of the given client, new client networking data, and a new client version number. The processing unit updates the global topology table by adding one or more new entry to the global topology table. The one or more new entry comprises the new client networking data, the client identifier of the given client, and respective increasing server version numbers greater than S1. The processing unit updates the entry of the client version table corresponding to the client identifier of the given client with the new client version number. The processing unit sends to the given client via the communication interface a server synchronization message. The server synchronization message comprises client networking data stored in the global topology table and having a client identifier different from the client identifier of the given client. The server synchronization message further comprises a current server version number.

According to a second aspect, the present disclosure relates to a method implemented by the server for performing synchronization of networking information with a client. The method comprises storing in a memory of the server a global topology table comprising a plurality of entries. Each entry comprises client networking data, a unique client identifier of one among a plurality of clients, and a unique server version number. The server version numbers increase from a first value corresponding to a first entry in the global topology table to a last value S1 corresponding to a last entry in the global topology table. The method comprises storing in the memory a client version table comprising one entry for each one among the plurality of clients. Each entry comprises the unique client identifier of one among the plurality of clients and a corresponding client version number. The method comprises receiving by a processing unit of the server from a given client among the plurality of clients via a communication interface of the server a client synchronization message. The client synchronization message comprises the client identifier of the given client, new client networking data, and a new client version number. The method comprises updating by the processing unit the global topology table by adding one or more new entry to the global topology table. The one or more new entry comprises the new client networking data, the client identifier of the given client, and respective increasing server version numbers greater than S1. The method comprises updating by the processing unit the entry of the client version table corresponding to the client identifier of the given client with the new client version number. The method comprises sending by the processing unit to the given client via the communication interface a server synchronization message. The server synchronization message comprises client networking data stored in the global topology table and having a client identifier different from the client identifier of the given client. The server synchronization message further comprises a current server version number.

According to a third aspect, the present disclosure relates to a server. The server comprises memory, a communication interface, and a processing unit. The memory stores a global topology table comprising a plurality of entries. Each entry comprises client networking data, a unique client identifier of one among a plurality of clients, and a unique server version number. The server version numbers increase from a first value corresponding to a first entry in the global topology table to a last value corresponding to a last entry in the global topology table. The memory comprises a client version table comprising one entry for each one among the plurality of clients. Each entry comprises the unique client identifier of one among the plurality of clients and a corresponding client version number. The processing unit receives from a given client via the communication interface a join message. The join message comprises the client identifier of the given client and an estimated server version number S4. The processing unit determines that the global topology table comprises at least one entry having a client identifier different from the client identifier of the given client and a server version number greater than the estimated server version number S4. The processing unit sends to the given client via the communication interface a server synchronization message. The server synchronization message comprises client networking data corresponding to the at least one entry of the global topology table having a client identifier different from the client identifier of the given client and a server version number greater than the estimated server version number S4, a current server version number, and the client version of the given client currently stored in the client version table.

According to a fourth aspect, the present disclosure relates to a method implemented by the server for performing resynchronization of networking information with a client. The method comprises storing in a memory of the server a global topology table comprising a plurality of entries. Each entry comprises client networking data, a unique client identifier of one among a plurality of clients, and a unique server version number. The server version numbers increase from a first value corresponding to a first entry in the global topology table to a last value corresponding to a last entry in the global topology table. The method comprises storing in the memory a client version table comprising one entry for each one among the plurality of clients. Each entry comprises the unique client identifier of one among the plurality of clients and a corresponding client version number. The method comprises receiving by a processing unit of the server from a given client via the communication interface of the server a join message. The join message comprises the client identifier of the given client and an estimated server version number S4. The method comprises determining by the processing unit that the global topology table comprises at least one entry having a client identifier different from the client identifier of the given client and a server version number greater than the estimated server version number S4. The method comprises sending by the processing unit to the given client via the communication interface a server synchronization message. The server synchronization message comprises client networking data corresponding to the at least one entry of the global topology table having a client identifier different from the client identifier of the given client and a server version number greater than the estimated server version number S4, a current server version number, and the client version of the given client currently stored in the client version table.

According to a particular aspect, the following applies to the server of the third aspect and the method of the fourth aspect. The processing unit receives from a given client via the communication interface a join message. The join message comprises the client identifier of the given client and an estimated server version number S4. The processing unit determines that the global topology table comprises at least one entry having a client identifier different from the client identifier of the given client and a server version number greater than the estimated server version number S4. The processing unit sends to the given client via the communication interface a server synchronization message. The server synchronization message comprises client networking data corresponding to the at least one entry of the global topology table having a client identifier different from the client identifier of the given client and a server version number greater than the estimated server version number S4, a current server version number, and the client version of the given client currently stored in the client version table.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the synchronization and resynchronization of networking information between client nodes and a centralized server, in the context of a fabric of a data center.

Network Architecture of a Data Center

Referring now concurrently to FIGS. 1A, 1B, 2, 3 and 4, the network architecture of a data center is illustrated. The network architecture represented in the Figures is for illustration purposes, and a person skilled in the art of designing data center architectures would readily understand that other design choices could be made. The teachings of the present disclosure are not limited to the topology of the network architecture represented in the Figures; but could also be applied to a network architecture with different design choices in terms of topology.

Figure 1A:
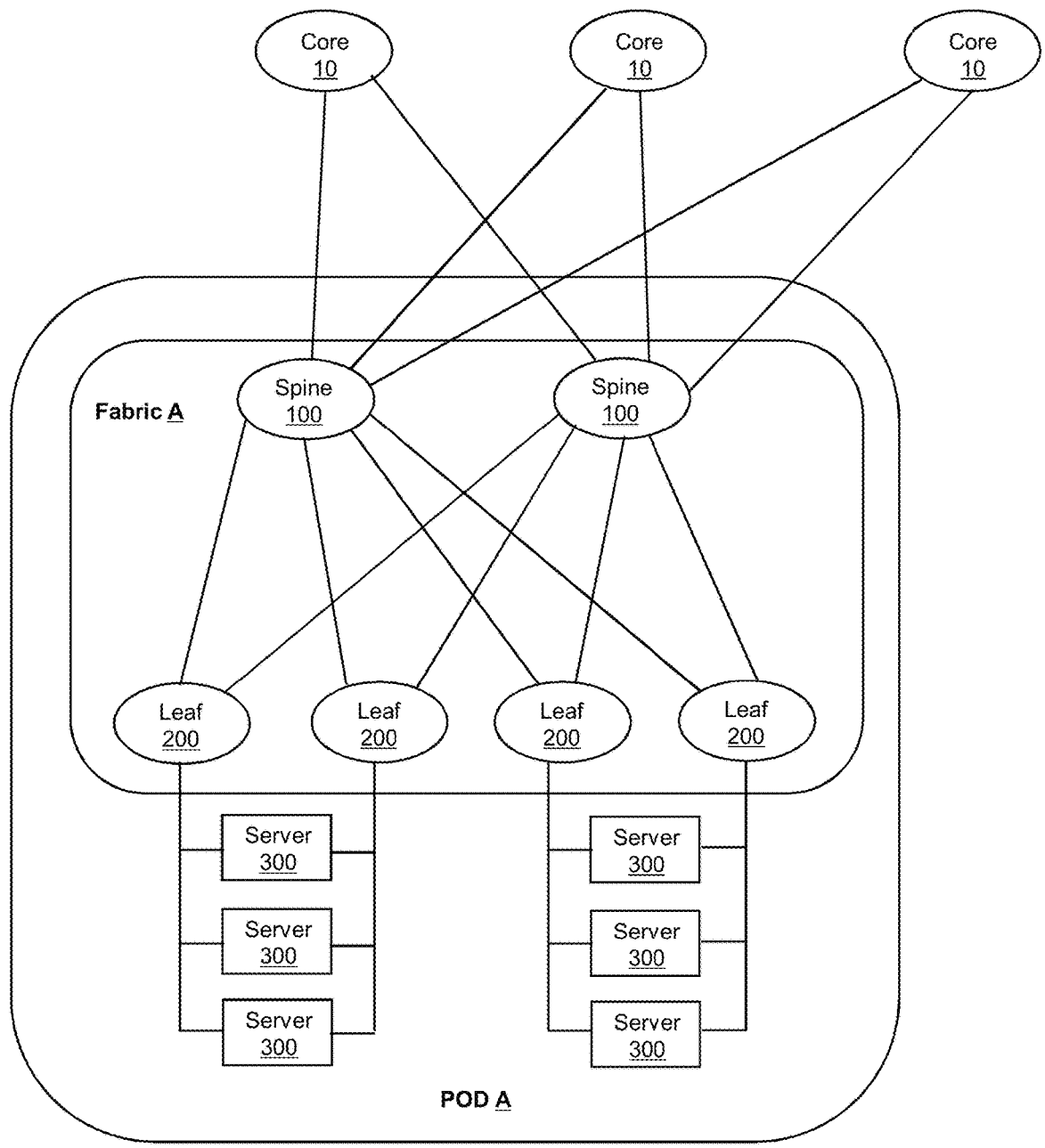
FIGS. 1A and 1B represent a network architecture of a data center comprising a plurality of pods and fabrics.
Figure 1B:
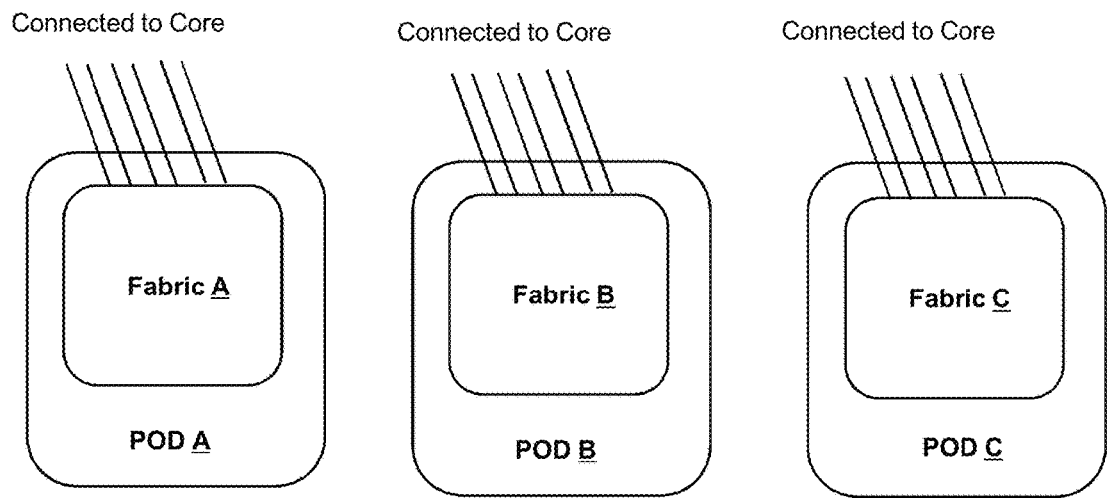

Reference is now made more particularly to FIGS. 1A and 1B. The data center is organized into a plurality of pods. Each pod consists of an atomic unit of computing, storage, networking and power. Each pod is designed as a unit, deployed as a unit, automated as a unit, and retired as a unit. Several types of pods may be available, which differ by their design. Zero, one or more instances of each type of pod is deployed in the data center. For illustration purposes, details of a single pod (A) have been represented in FIG. 1A and three pods (A, B and C) have been represented in FIG. 1B. However, the number of pods in the data center varies from one to tens or even hundreds of pods. The capacity in terms of computing, storage, networking and power of the data center is scaled, by adding (or removing) pods.

Pod A comprises a plurality of servers 300 providing the processing and storage power. The servers 300 are physically organized in one or more racks, depending on the number of servers 300 and the capacity of each rack. Pod A also comprises two hierarchical levels of networking power referred to as fabric A. Fabric A comprises a lower hierarchical level consisting of leaf networking equipment 200, and an upper hierarchical level consisting of spine networking equipment 100. The networking equipment (e.g. spine 100 and leaf 200) of fabric A are physically integrated to the one or more racks comprising the servers 300, or alternatively are physically organized in one or more independent racks.

The leaf networking equipment 200 and the spine networking equipment 100 generally consist of switches, with a high density of communication ports. Therefore, in the rest of the description, the leaf networking equipment 200 and the spine networking equipment 100 will be respectively referred to as leaf switches 200 and spine switches 100. However, other types of networking equipment may be used. For example, in an alternative implementation, at least some of the spine networking equipment 100 consist of routers.

Each leaf switch 200 is connected to at least one spine switch 100, and a plurality of servers 300. The number of servers 300 connected to a given leaf switch 200 depends on the number of communication ports of the leaf switch 200.

In the implementation represented in FIG. 1A, each server 300 is redundantly connected to two different leaf switches 200. A server 300 of a given pod (e.g. pod A) is only connected to leaf switches 200 of the fabric (e.g. fabric A) belonging to the given pod (e.g. pod A). A server 300 of a given pod (e.g. pod A) is not connected to leaf switches 200 of a fabric (e.g. fabric B) belonging to another pod (e.g. pod B). Each leaf switch 200 of a given fabric (e.g. fabric A) is connected to all the spine switches 100 of the given fabric (e.g. fabric A). A leaf switch 200 of a given fabric (e.g. fabric A) is not connected to a spine switch 100 of another fabric (e.g. fabric B). In an alternative implementation not represented in the Figures, at least some of the servers 300 are connected to a single leaf switch 200.

Each spine switch 100 is connected to at least one core networking equipment 10, and a plurality of leaf switches 200. The number of leaf switches 200 connected to a given spine switch 100 depends on design choices and on the number of communication ports of the spine switch 100. The core networking equipment 10 provide interworking between the fabrics deployed in the data center, connection to management functionalities of the data center, connection to external networks such as the Internet, etc. Furthermore, although not represented in the Figures for simplification purposes, at least some of the core networking equipment 10 may be connect to a pair of leaf switches 200.

The core networking equipment 10 generally consist of routers. Therefore, in the rest of the description, the core networking equipment 10 will be referred to as core routers 10. However, other types of networking equipment may be used. For example, in an alternative implementation, at least some of the core networking equipment 10 consist of switches.

In the implementation represented in FIG. 1A, each spine switch 100 of a given fabric (e.g. fabric A) is connected to all the core routers 10 and is connected to all the leaf switches 200 of the given fabric (e.g. fabric A).

For simplification purposes, fabric A represented in FIG. 1A only comprises two spine switches 100 and four leaf switches 200, while pod A only comprises two groups of three servers 300 respectively connected to leaf switches 200 of the fabric A. However, the number of spine switches 100 and leaf switches 200 of a fabric may vary, based on design choices and networking capabilities (e.g. communication port density) of the spine and leaf switches. Similarly, the total number of servers 300 of a pod may vary, based on design choices, based on the number of leaf switches 200 of the corresponding fabric, and based on networking capabilities (e.g. communication port density) of the leaf switches.

The details of pod B and its corresponding fabric B, as well as pod C and its corresponding fabric C, are not represented in FIG. 1B for simplification purposes. However, pod B/fabric B and pod C/fabric C include a hierarchy of spine switches 100, leaf switches 200 and servers 300 similar to the hierarchy illustrated for pod A/fabric A.

Figure 2:
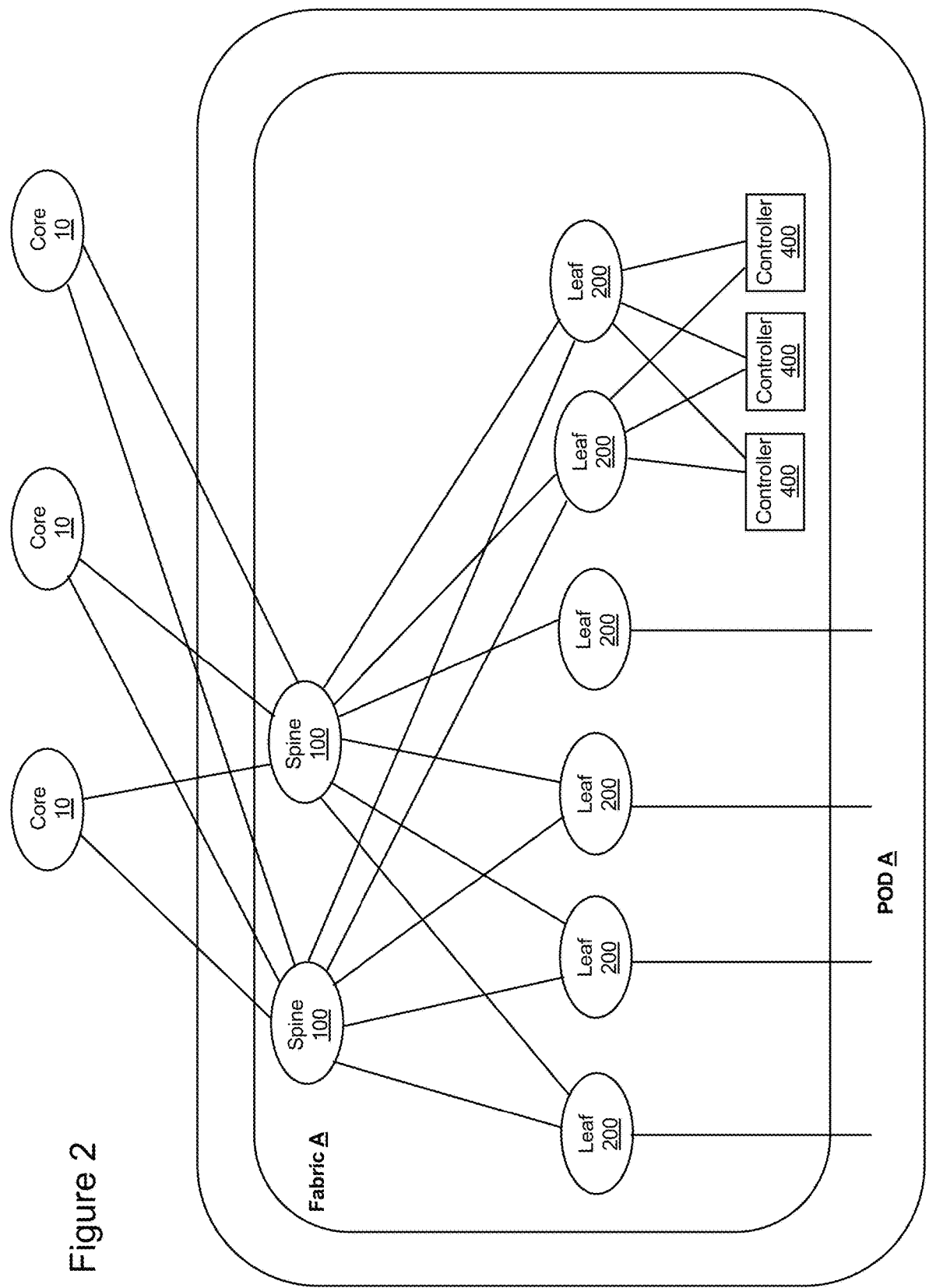
FIG. 2 represents a more detailed view of the fabrics represented in FIGS. 1A and 1B.

Reference is now made more particularly to FIGS. 1A, 1B and 2, where FIG. 2 represents an implementation of the data center of FIGS. 1A and 1B, where each fabric further includes one or more controllers 400. The servers 300 have not been represented in FIG. 2 for simplification purposes only.

The controllers 400 of a fabric are responsible for controlling operations of at least some of the nodes (e.g. leaf switches 200 and/or spine switches 100) included in the fabric. Each controller 400 is connected to at least one leaf switch 200. The number of controllers 400 deployed in a given fabric depends on design choices, on the required cumulative processing power of the controllers 400 deployed in the fabric, on the total number of leaf and spine switches deployed in the fabric, etc.

In the implementation represented in FIG. 2, each controller 400 is redundantly connected to two different leaf switches 200. For example, each controller 400 has a first operational connection to a first leaf switch 200, and a second backup connection to a second leaf switch 200. A controller 400 of a given fabric (e.g. fabric A) is only connected to leaf switches 200 of the fabric (e.g. fabric A). A controller 400 of a given fabric (e.g. fabric A) is not connected to leaf switches 200 of another fabric (e.g. fabric B or C). Some leaf switches 200 are dedicated to being connected to controllers 400 (as illustrated in FIG. 2), while other leaf switches 200 are dedicated to being connected to servers 300 (as illustrated in FIG. 1A). In an alternative implementation, a leaf switch 200 is concurrently connected to servers 300 and controllers 400.

In another implementation, the controllers 400 are not directly physically connected to the leaf switches 200; but are functionally connected via at least one intermediate equipment such as an intermediate switch (not represented in FIG. 2) between the controllers 400 and the leaf switches 200.

Figure 3:
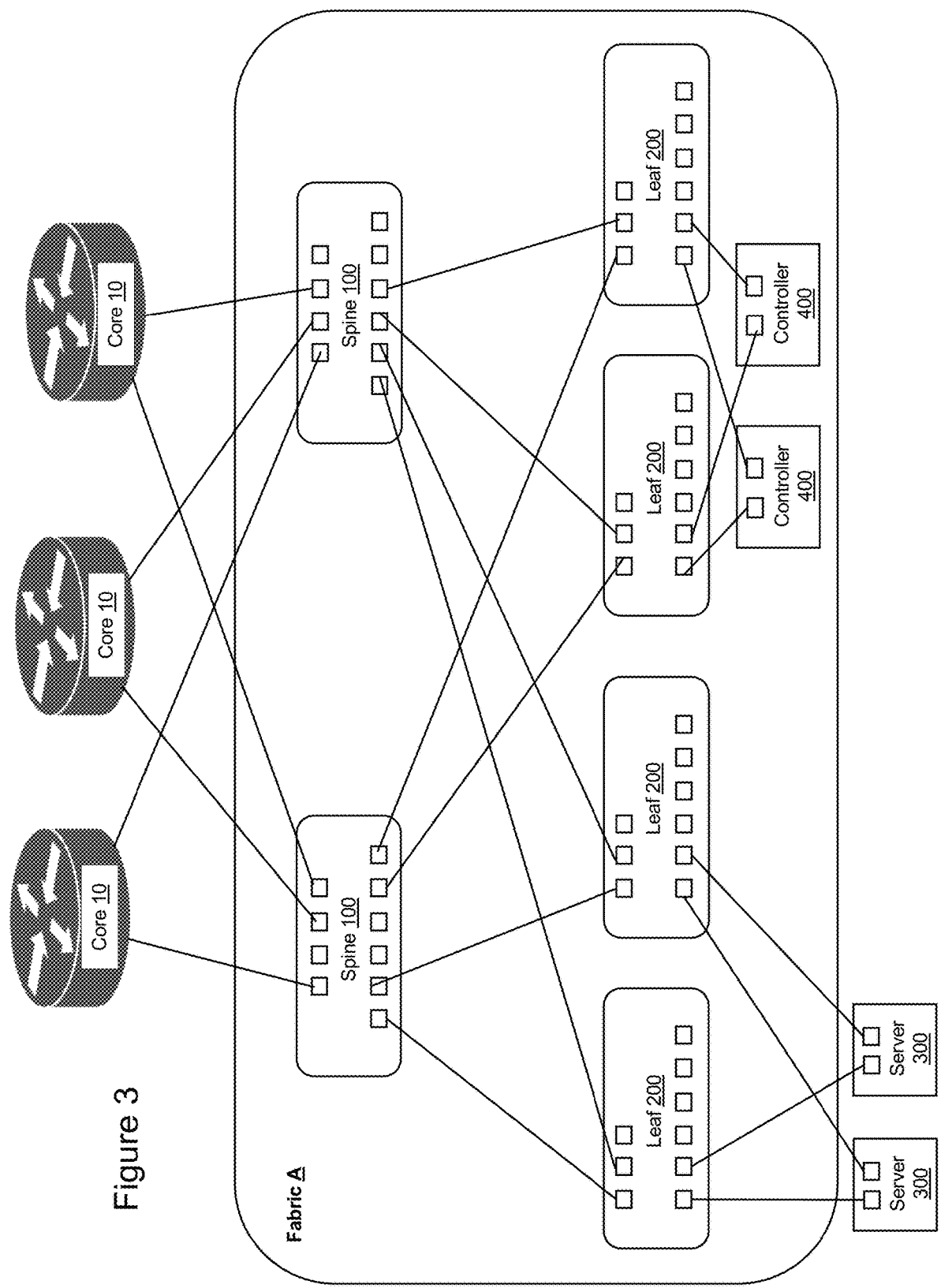
FIG. 3 represents communication ports of the equipment deployed in the pods and fabrics of FIGS. 1A-B and 2.

Reference is now made more particularly to FIGS. 1A, 1B, 2 and 3, where FIG. 3 represents communication ports of the equipment deployed in a fabric/pod.

The spine switches 100 have a dedicated number of uplink communication ports (e.g. 4 represented in FIG. 3) dedicated to the interconnection with the core routers 10, and a dedicated number of downlink communication ports (e.g. 6 represented in FIG. 3) dedicated to the interconnection with the leaf switches 200. The uplink and downlink ports have the same or different networking capabilities. For example, all the ports have a capacity of 10 Gigabytes (Gbps).

The leaf switches 200 have a dedicated number of uplink communication ports (e.g. 3 represented in FIG. 3) dedicated to the interconnection with the spine switches 100, and a dedicated number of downlink communication ports (e.g. 6 represented in FIG. 3) dedicated to the interconnection with the servers 300 or controllers 400. The uplink and downlink ports have the same or different networking capabilities. For example, all the uplink ports have a capacity of 100 Gbps and all the downlink ports have a capacity of 25 Gbps. In the future, the capacity of the uplink ports will reach 200 or 400 Gbps, while the capacity of the downlink ports will reach 50 Gbps or 100 Gbps.

The leaf and spine switches generally consist of equipment with a high density of communication ports, which can reach a few dozens of ports. Some of the ports may be electrical ports, while others are fiber optic ports. As mentioned previously, the ports of a switch may have varying networking capabilities in terms of supported bandwidth. Switches with different networking capabilities and functionalities are generally used for implementing the leaf switches and the spine switches. The ports are not limited to communication ports, but also include enclosures for connecting various types of pluggable media.

By contrast, the servers 300 and controllers 400 are computing devices similar to traditional computers, with a limited number of communication ports. For example, each server 300 and each controller 400 comprises two communication ports, respectively connected to two different leaf switches 200. The two communication ports generally consist of Ethernet ports, with a capacity of for example 10 Gbps. However, the servers 300 and/or controllers 400 may include additional port(s).

All the aforementioned communication ports are bidirectional, allowing transmission and reception of data.

Figure 4A:
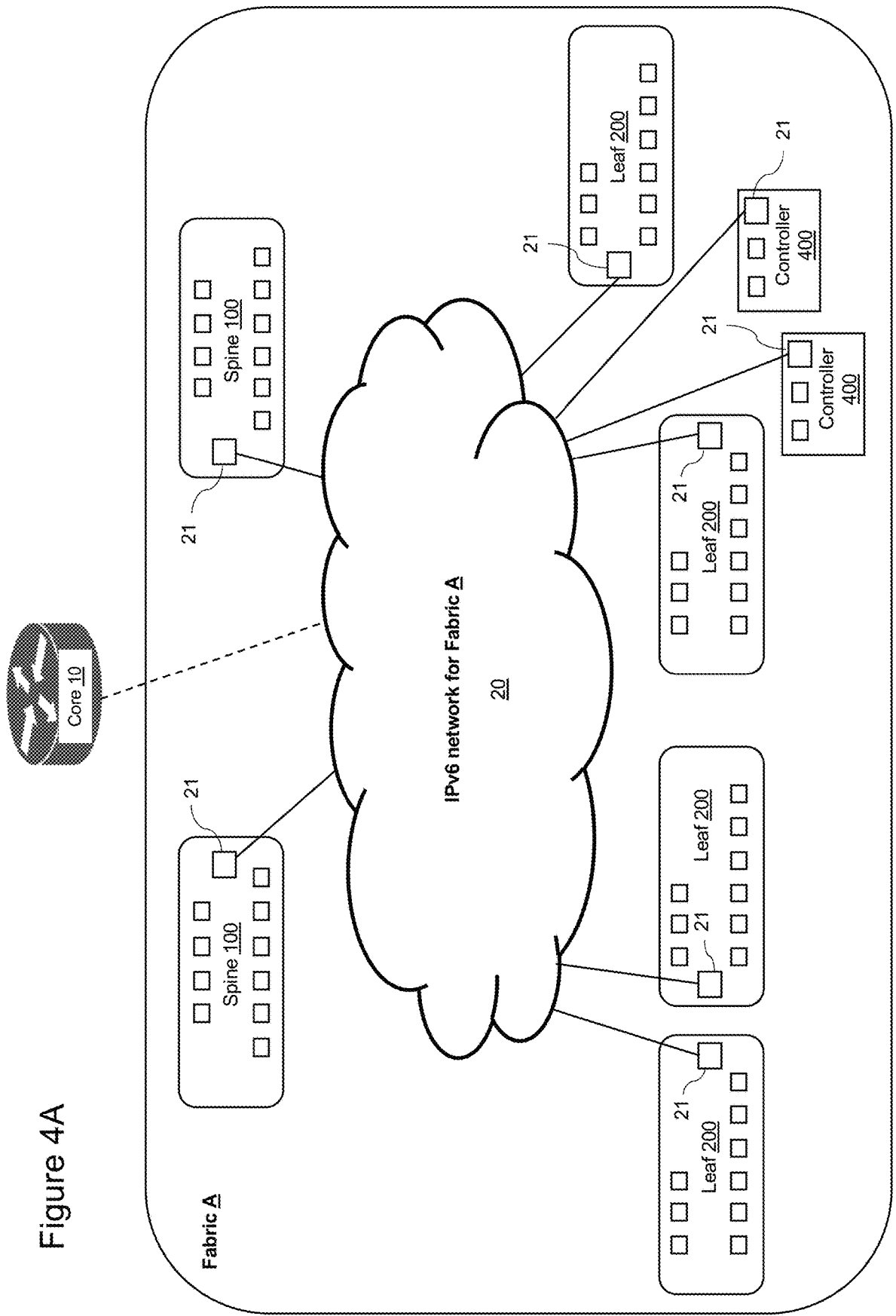
FIGS. 4A and 4B represent an IPv6 network for interconnecting equipment of the fabrics represented in FIGS. 1-3.
Figure 4B:
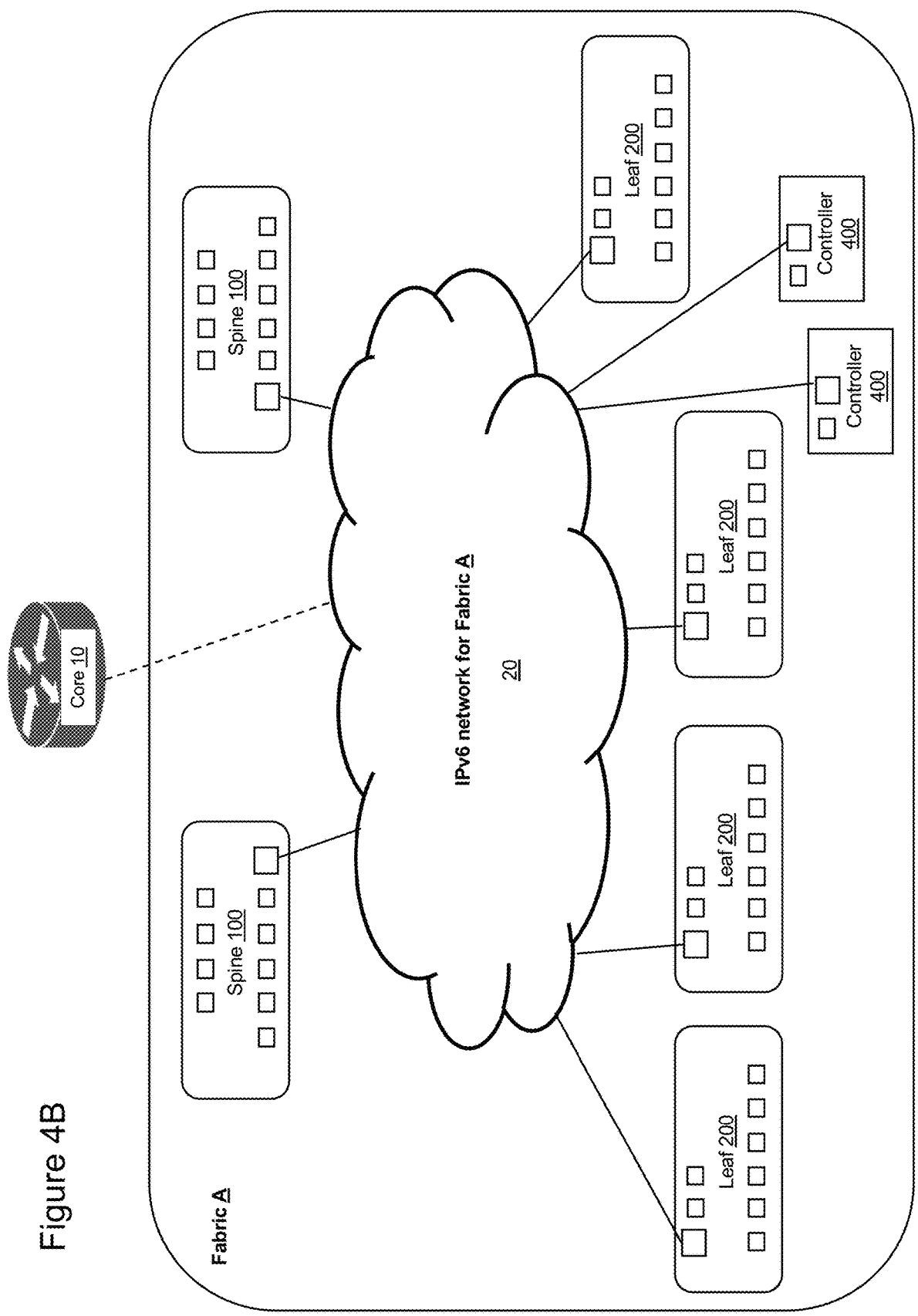

Reference is now made more particularly to FIGS. 4A and 4B, which represent the deployment of an IPv6 network 20 at the fabric level.

At least some of the equipment of the fabric are connected to the IPv6 network 20 and exchange data via this IPv6 network. In the configuration illustrated in FIGS. 4A and 4B, all the spine switches 100, leaf switches 200 and controllers 400 are connected to the IPv6 network 20. Each fabric (e.g. fabrics A, B and C as illustrated in FIGS. 1A and 1B) has its own IPv6 network, with a dedicated IPv6 prefix for each fabric.

Optionally, additional equipment are connected to the IPv6 network 20. For example, one or more of the core routers 10 are connected to the IPv6 network 20, as illustrated in FIGS. 4A and 4B. Configuration and/or management servers (not represented in FIGS. 4A and 4B for simplification purposes) have access to the IPv6 network 20 through the core router 10.

Optionally, a dedicated switch and/or router (not represented in FIGS. 4A and 4B for simplification purposes) is used for interconnecting the equipment of the fabric A which exchange data via the IPv6 network 20. The aforementioned optional configuration and/or management servers have access to the IPv6 network 20 through the dedicated switch and/or router.

FIG. 4A represents a first illustrative configuration where each equipment of the fabric A (spine switch 100, leaf switch 200 and controller 400) has a dedicated port 21 for accessing the IPv6 network 20. The IPv6 network 20 is a configuration and/or management network isolated from the other IP networks implemented by the fabric A. The dedicated ports 21 of the spine switches 100, leaf switches 200 and controllers 400 are only used to exchange data through the IPv6 network 20. Thus, the IPv6 traffic exchanged via the dedicated ports 21 of the spine switches 100, leaf switches 200 and controllers 400 is isolated from the traffic exchanged via the other ports of the spine switches 100, leaf switches 200 and controllers 400 (illustrated in FIG. 3).

FIG. 4B represents a second illustrative configuration where each equipment of the fabric A (spine switch 100, leaf switch 200 and controller 400) does not use a dedicated port for accessing the IPv6 network 20. On the contrary, a port already used for exchanging other data traffic (illustrated in FIG. 3) is also used for accessing the IPv6 network 20.

This configuration has the advantage of not monopolizing a dedicated port at each equipment of the fabric A (spine switch 100, leaf switch 200 and controller 400) solely for accessing the IPv6 network 20.

In an alternative configuration not represented in the Figures, some of the equipment of the fabric A are using a dedicated port for accessing the IPv6 network 20; while other equipment of the fabric A access the IPv6 network 20 through a port also used for exchanging other data traffic.

Furthermore, some of the equipment of the fabric A may use more than one port for accessing the IPv6 network 20.

Local and Global Topology Tables

Figure 5:
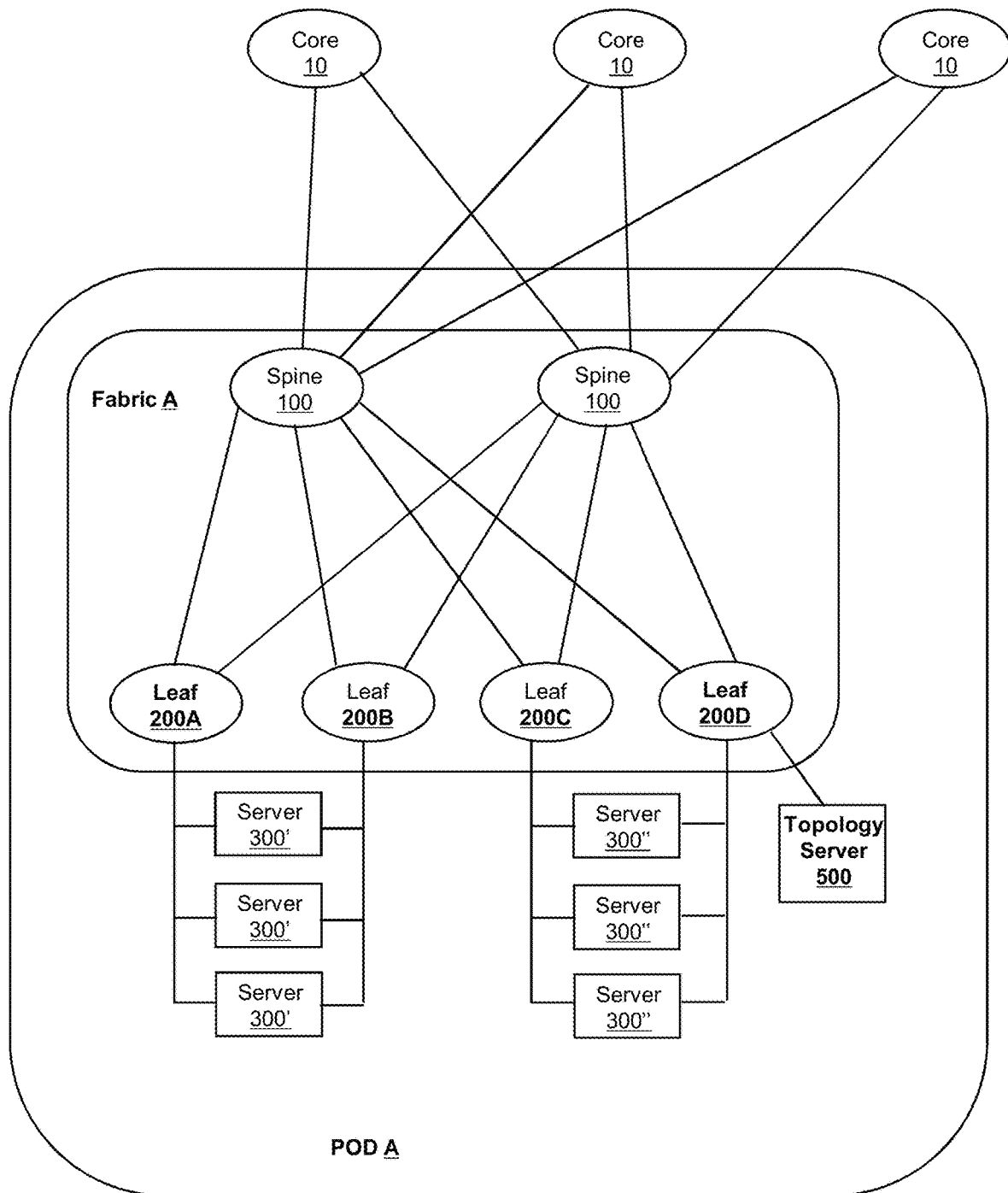
FIG. 5 represents the fabric of FIG. 1A further comprising a topology server.

Reference is now made to FIG. 5, which represents the Fabric A and Pod A of FIG. 1A. FIG. 5 further represents a topology server 500. The topology server 500 may be one of the controllers 400 represented in FIG. 3.

The topology server 500 is a repository for various networking information collected by the leaf switches about their neighbors. For example, leaf switch 200A stores the collected networking information about its neighbors locally, and further transmits the networking information to the topology server 500. The topology server 500 stores the networking information collected by leaf switch 200A, and forwards the networking information to the other leaf switches 200B, 200C and 200D. Similarly, the topology server 500 stores networking information received from the other leaf switches 200B, 200C and 200D; and forwards the networking information to leaf switch 200A. The present disclosure aims at providing mechanisms for synchronizing the networking information stored at the leaf switches 200A-D and the networking information stored at the topology server 500.

Each leaf switch (e.g. 200A) stores a local topology table. Each entry of the local topology table comprises local networking data and a unique local version number. The local version numbers increase from a first value (e.g. 1) corresponding to a first entry in the local topology table to a last value corresponding to a last entry in the local topology table.

Following is an exemplary local topology table.

| Local networking data | 1 |
| Local networking data | 2 |
| Local networking data | 3 |

The collection of the local networking data by the leaf switches is out of the scope of the present disclosure. The collection is based on standardized networking protocols such as the address resolution protocol (ARP), the neighbor discovery protocol (NDP), etc. Proprietary protocols specifically designed for the context of large data centers may also be used. The leaf switches receive packets compliant with the aforementioned protocols, and extract information from the received packets, the extracted information being used for generating the local networking data. The collection of local networking data is generally not exclusively based on networking protocols. For example, local events from the forwarding plane indicating that a new MAC address has been discovered, an existing one has moved from one port to another, or that an existing entry has not been used for a certain period of time and is being expunged from a table The local networking data are transmitted to the topology server 500, to be stored and further dispatched to the other leaf switches (e.g. 200B, 200C and 200D). The local version numbers are used for synchronizing the data stored in the local topology table with data stored by the topology server 500.

In an exemplary implementation, the local networking data include information related to a remote node and an identifier of an intermediate node. A computing device having the local networking data determines that it is possible to reach the remote node via the intermediate node.

Examples of information related to a remote node include a Media Access Control (MAC) address of the remote node, an Internet Protocol (IP) address (IPv4 or IPv6) of the remote node, a combination of a MAC address and an IP address of the remote node, a tuple (protocol (e.g. User Datagram Protocol (UDP) or Transmission Control Protocol (TCP)), source and destination IP address, source and destination port) identifying a network connection of the remote node, etc.

Examples of an identifier of an intermediate node include an IP address (IPv4 or IPv6) of the intermediate node, a MAC address of the intermediate node, etc.

For example, the remote nodes include server 300' reachable via leaf switch 200A and the intermediate node is the leaf switch 200A itself. The information related to the remote nodes include information related to the server 300' (e.g. IPv4 or IPv6 address of the servers 300'). The identifier of the intermediate node is an IPv4 or an IPv6 address (or a MAC address) of the leaf switch 200A.

Following is an exemplary local topology table detailing the local networking data.

| IPv6 address of a first server 300' | IPv6 address of leaf switch 200A | 1 |
| IPv6 address of a second server 300' | IPv6 address of leaf switch 200A | 2 |
| IPv6 address of a third server 300' | IPv6 address of leaf switch 200A | 3 |

Each leaf switch (e.g. 200A) also stores a server topology table. Each entry of the server topology table comprises server networking data.

Following is an exemplary server topology table.

| Server networking data |
| Server networking data |
| Server networking data |
| Server networking data |

The server networking data are received from the topology server 500, and originate from other leaf switches (e.g. 200B, 200C and 200D). The structure of the server networking data is similar to the previously described structure of the local networking data.

Following is an exemplary server topology table detailing the server networking data.

| IPv6 address of a first server 300' | IPv6 address of leaf switch 200B |
| IPv6 address of a second server 300" | IPv6 address of leaf switch 200D |
| IPv6 address of a third server 300' | IPv6 address of leaf switch 200B |
| IPv6 address of a fourth server 300" | IPv6 address of leaf switch 200C |

Each leaf switch (e.g. 200A) further stores a server version number transmitted by the topology server 500. The server version number is used for synchronizing the data stored in the server topology table with data stored by the topology server 500.

The topology server 500 stores a global topology table. Each entry of the global topology table comprises client networking data, a unique client identifier of a client, and a unique server version number. The server version numbers increase from a first value (e.g. 1) corresponding to a first entry in the global topology table to a last value corresponding to a last entry in the global topology table.

Following is an exemplary global topology table.

| Client networking data | Client identifier of originating client | 1 |
| Client networking data | Client identifier of originating client | 2 |
| Client networking data | Client identifier of originating client | 3 |

The clients are the leaf switches (e.g. 200A, 200B, 200C and 200D). The topology server 500 centralizes client networking data received from the leaf switches (in the global topology table), and further dispatches client networking data received from one of the leaf switches to the other leaf switches. The structure of the client networking data is similar to the previously described structure of the local networking data.

The unique client identifier of each originating client depends on a particular implementation. For example, the MAC address of the leaf switches is used for the unique client identifiers. Alternatively, an IPv4 or IPv6 address of the leaf switches is used for the unique client identifiers (each IP address used is unique among all the leaf switches). In still another alternative, a unique identifier (a node ID) generated locally by each leaf switch is used for the unique client identifiers. A person skilled in the art would readily understand that other types of unique client identifier may be used.

Following is an exemplary global topology table detailing the client networking data.

| IPv6 addr of first server 300' | IPv6 addr of leaf 200A | Unique ID of leaf 200 A | 1 |
| IPv6 addr of second server 300' | IPv6 addr of leaf 200B | Unique ID of leaf 200B | 2 |
| IPv6 addr of third server 300'' | IPv6 addr of leaf 200D | Unique ID of leaf 200D | 3 |
| IPv6 addr of fourth server 300' | IPv6 addr of leaf 200B | Unique ID of leaf 200B | 4 |
| IPv6 addr of fifth server 300'' | IPv6 addr of leaf200C | Unique ID of leaf 200C | 5 |

It should be noted that the identifier in column 2 is not necessarily unique and may become obsolete over time (in this case, the corresponding entry in the global topology table shall be removed, as will be explained later in the description. By contrast, the identifier in column 3 is unique and remains valid over time. Furthermore, the identifiers in columns 2 and 3 refer to the same device (a leaf switch). However, in another implementation, the intermediate node (column 2) is not a leaf switch but another equipment (e.g. another switch) between the remote node (servers in column 1) and the client (leaf switch in column 3).

The topology server 500 also stores a client version table comprising one entry for each of the clients (e.g. leaf switches 200A, 200B, 200C and 200D) from which the topology server 500 has received client networking data. Each entry comprises the unique client identifier of a client and a corresponding client version number (transmitted by the client each time the client sends new client networking data to the topology server 500). The client version numbers are used for synchronizing the data stored in the global topology table of the topology server 500 with data stored locally by the clients.

Following is an exemplary client version table.

| Unique ID of leaf 200 A | 5 |
| Unique ID of leaf 200B | 1 |
| Unique ID of leaf 200C | 3 |
| Unique ID of leaf 200D | 2 |

Local Topology Table Management

Figure 6:
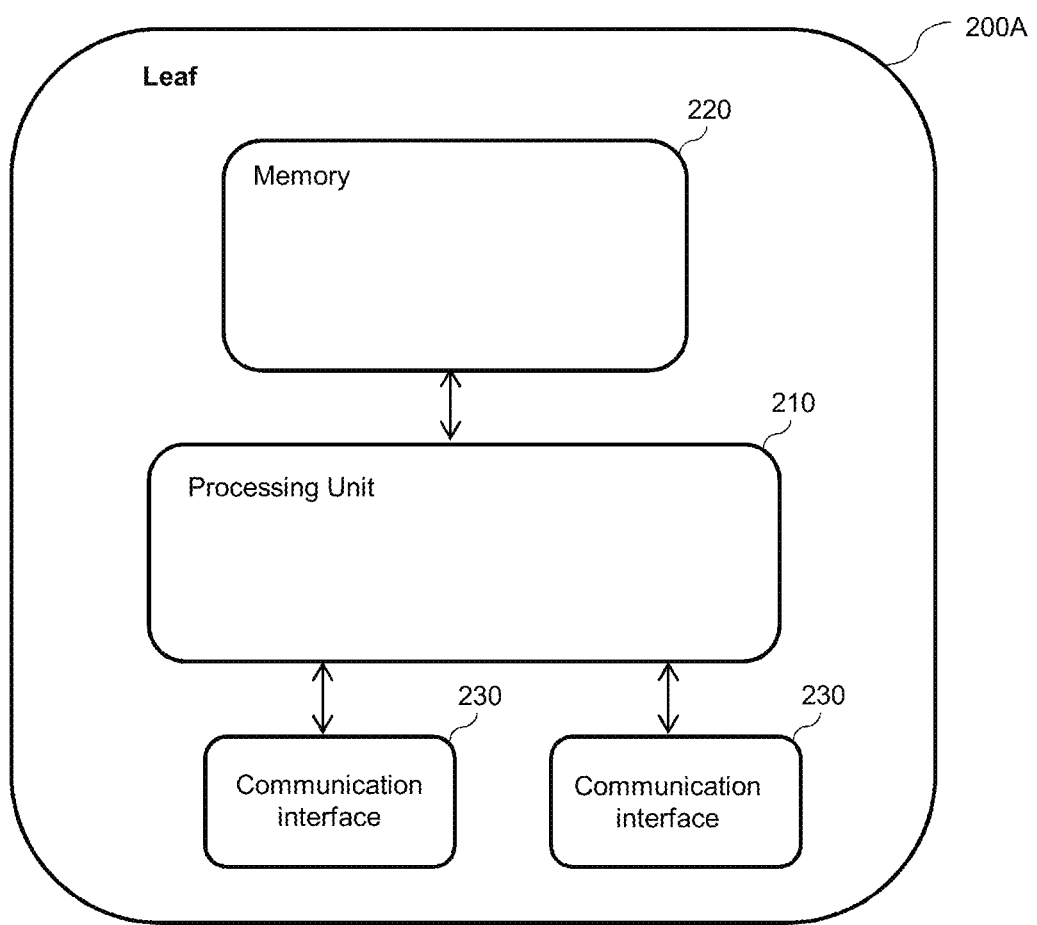
FIG. 6 illustrates a schematic representation of a leaf switch represented in FIG. 5.
Figure 7A:
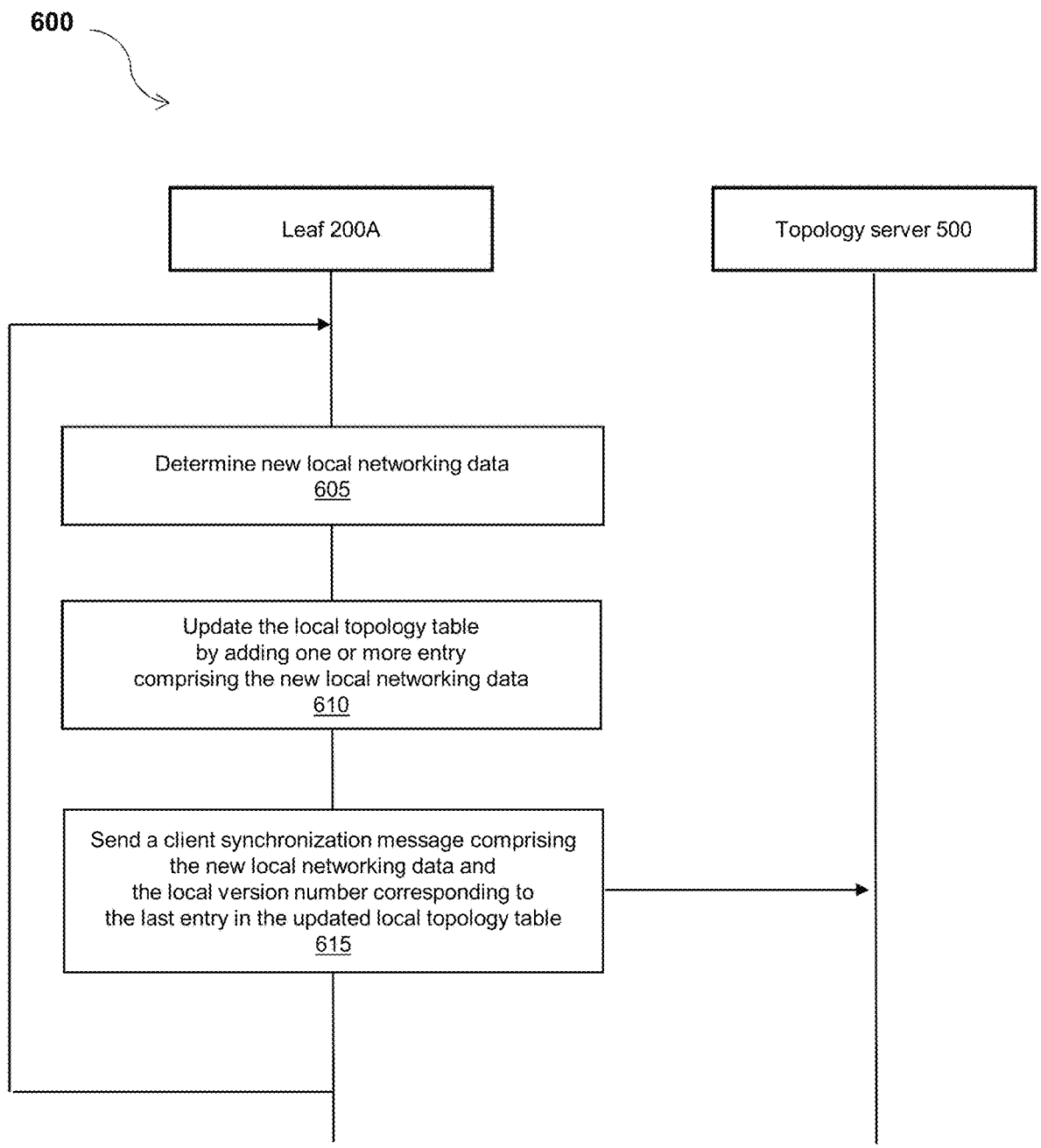
FIGS. 7A, 7B, 7C and 7D represent a method for performing synchronization and resynchronization of networking information between a leaf switch and the topology server represented in FIG. 5.
Figure 7B:
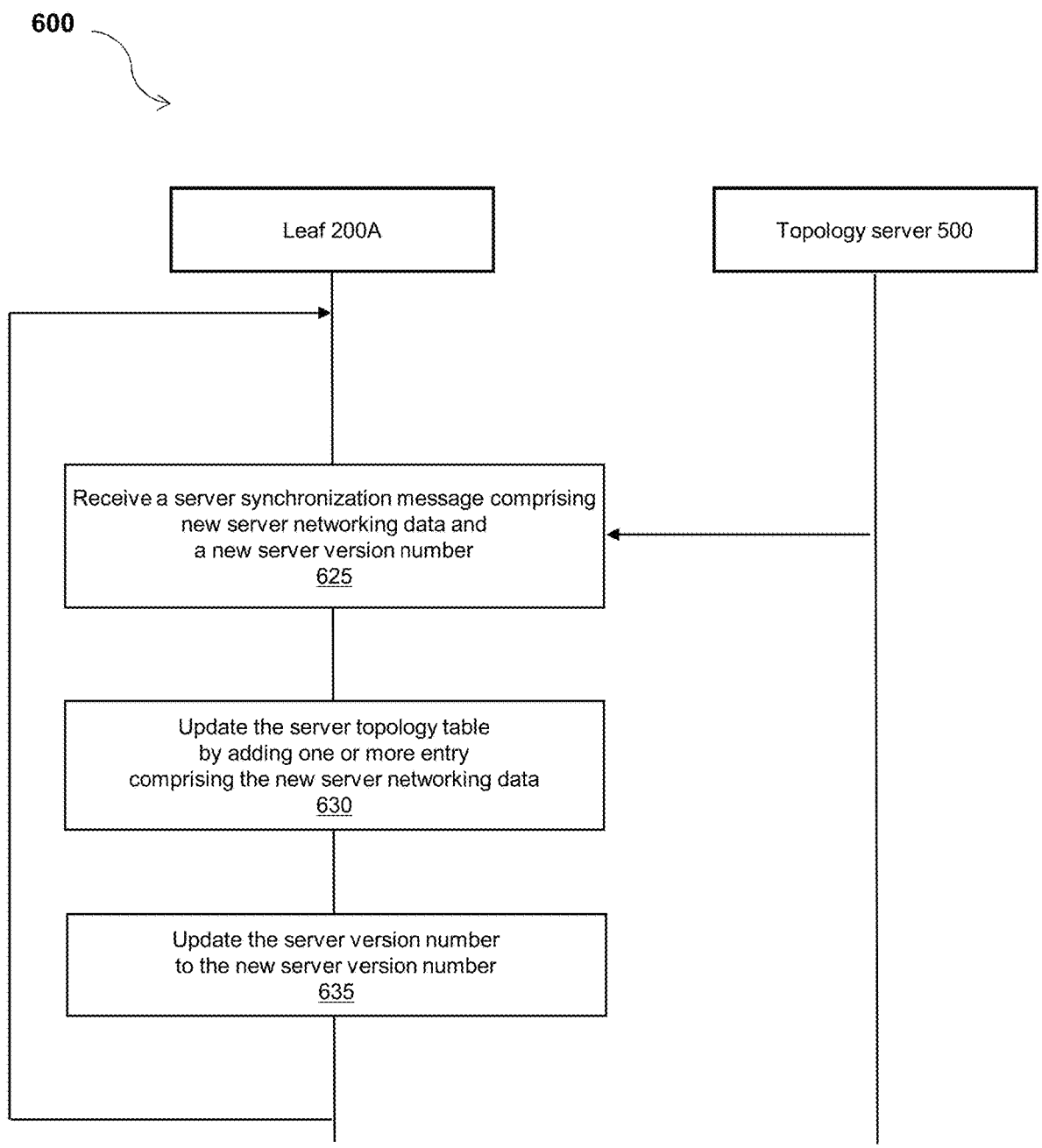
Figure 7C:
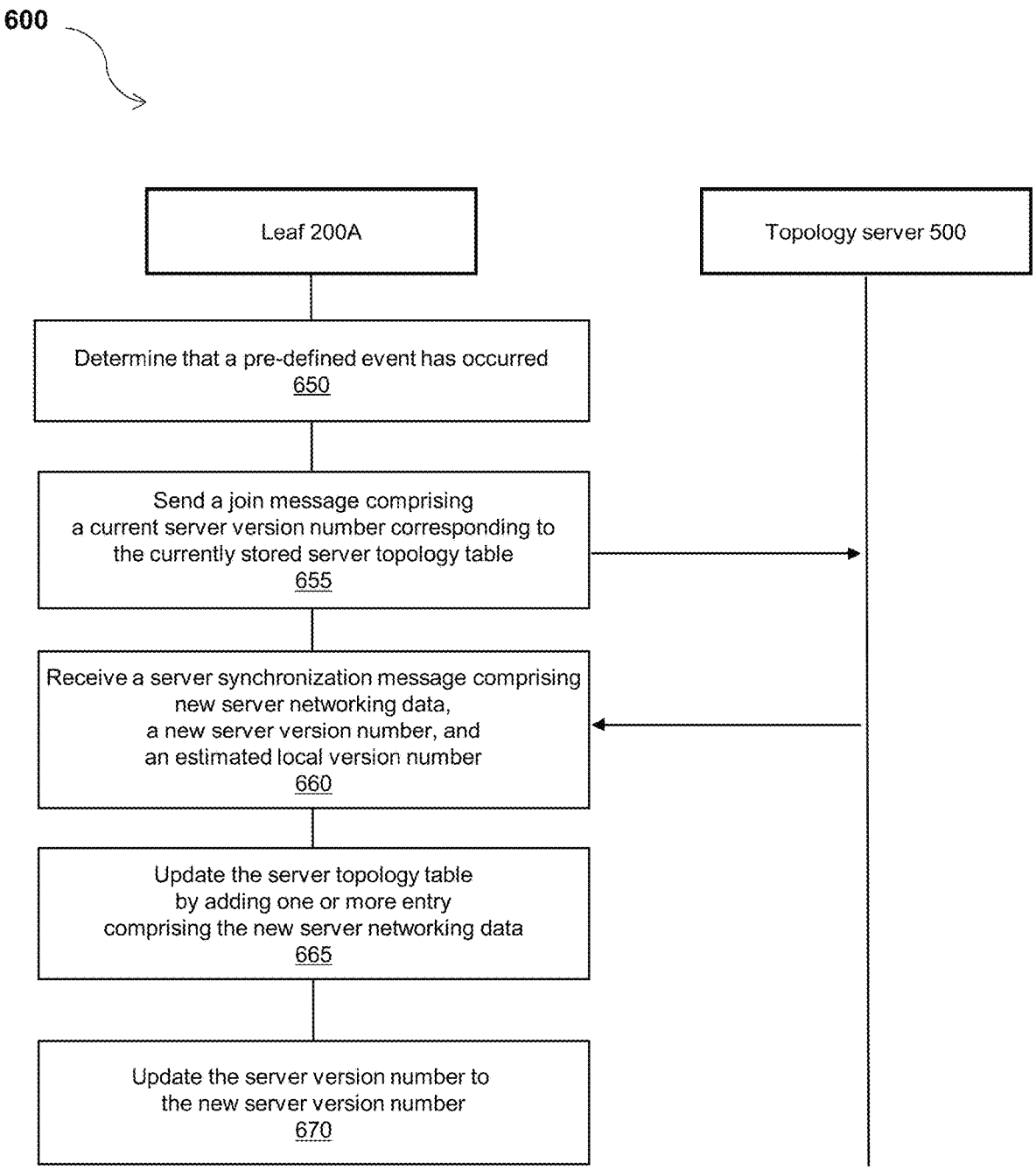
Figure 7D:
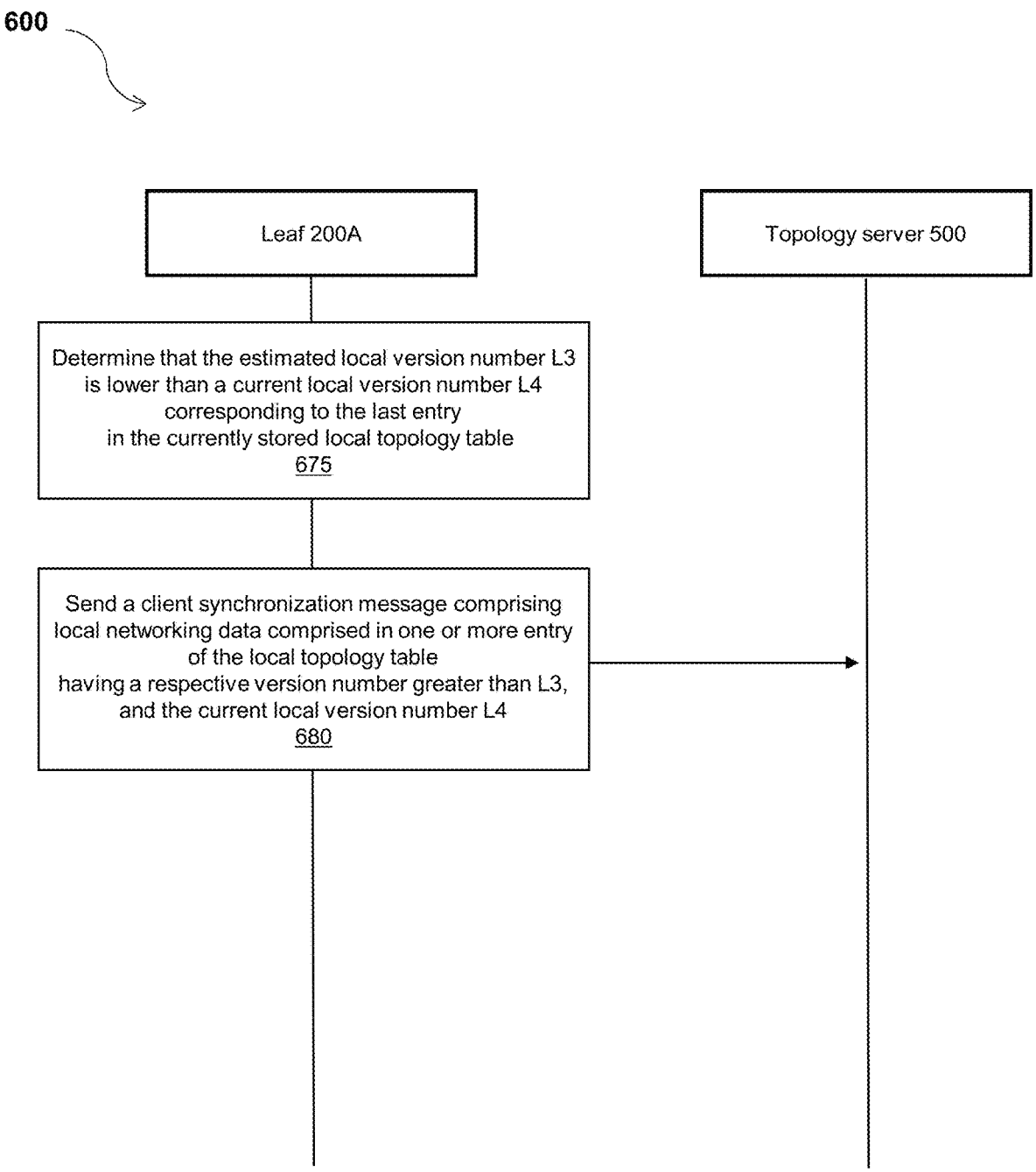

Referring now concurrently to FIGS. 5 and 6, a computing device is illustrated in FIG. 6. The computing device is a generic functional representation of the leaf switches represented in FIG. 5. Although the computing device of FIG. 6 has the reference number 200A for illustration purposes, it represents any of the leaf switches 200A, 200B, 200C and 200D.

The computing device 200A comprises a processing unit 210, memory 220, and at least one communication interface 230. The computing device 200A may comprise additional components (not represented in FIG. 6 for simplification purposes). For example, the computing device 200A may include a user interface and/or a display.

The processing unit 210 comprises one or more processors (not represented in FIG. 6) capable of executing instructions of a computer program. Each processor may further comprise one or several cores. The processing unit 210 generally also includes one or more dedicated processing components (e.g. a network processor, an Application Specific Integrated Circuits (ASIC), etc.) for performing specialized networking functions (e.g. packet forwarding).

The memory 220 stores instructions of computer program (s) executed by the processing unit 210, data generated by the execution of the computer program(s) by the processing unit 210, data received via the communication interface(s) 230, etc. Only a single memory 220 is represented in FIG. 6, but the computing device 200A may comprise several types of memories, including volatile memory (such as Random Access Memory (RAM)) and non-volatile memory (such as a hard drive, Erasable Programmable Read-Only Memory (EPROM), Electrically-Erasable Programmable Read-Only Memory (EEPROM), etc.). TCAM (ternary content addressable memory) is another example of memory that is frequently used by networking equipment to store forwarding entries.

Each communication interface 230 allows the computing device 200A to exchange data with other devices. For example, at least some of the communication interfaces 230 (only two are represented in FIG. 6 for simplification purposes) correspond to the ports of the leaf switches 200 represented in FIGS. 3, 4A and 4B. Examples of communication interfaces 230 include standard (electrical) Ethernet ports, fiber optic ports, ports adapted for receiving Small Form-factor Pluggable (SFP) units, etc. The communication interfaces 230 are generally of the wireline type; but may also include some wireless ones (e.g. a Wi-Fi interface). Each communication interface 230 comprises a combination of hardware and software executed by the hardware, for implementing the communication functionalities of the communication interface 230. Alternatively, the combination of hardware and software for implementing the communication functionalities of the communication interface 230 is at least partially included in the processing unit 210.

Referring now concurrently to FIGS. 5, 6, 7A, 7B, 7C and 7D, a method 600 for performing synchronization and resynchronization of networking information with the topology server 500 is illustrated in FIGS. 7A-D. The steps of the method 600 are performed by at least some of the leaf switches 200A-D represented in FIG. 5. For illustration purposes, the method 600 will be described with reference to the leaf switch 200A represented in FIGS. 5 and 6.

A dedicated computer program has instructions for implementing the steps of the method 600. The instructions are comprised in a non-transitory computer program product (e.g. the memory 220) of the leaf switch 200A. The instructions, when executed by the processing unit 210 of the leaf switch 200A, provide for performing synchronization and resynchronization of networking information with the topology server 500. The instructions are deliverable to the leaf switch 200A via an electronically-readable media such as a storage media (e.g. CD-ROM, USB key, etc.), or via communication links (e.g. via a communication network through one of the communication interfaces 230).

The local topology table has been described previously in relation to FIG. 5. The local topology table stored in the memory 220 is initially empty. Each iteration of steps 605, 610 and 615 of the method 600 populates the local topology table.

In the following, we consider a stage (after one or more iteration of steps 605, 610 and 615) where the local topology table comprises a plurality of entries, the last entry in the local topology table having a local version number L1.

Following is a simplified exemplary version of the local topology table with details provided only for the last entry.

| ... | ... |
| ... | ... |
| Local networking data | L1 |

The method 600 comprises the step 605 of determining new local networking data. Step 605 is executed by the processing unit 210. The determination of the new local networking data has been described previously in relation to FIG. 5.

The method 600 comprises the step 610 of updating the local topology table by adding one or more new entry to the local topology table. Step 610 is executed by the processing unit 210. The one or more new entry comprises the new local networking data and respective increasing local version numbers greater than L1. The last entry in the updated local topology table has a local version number L2 (greater than L1).

Following is a simplified exemplary version of the updated local topology table when the new local networking data generate a single new entry.

| ... | ... |
| ... | ... |
| Local networking data | L1 |
| New local networking data | L2 |

The method 600 comprises the step 615 of sending to the topology server 500 via the communication interface 230 a client synchronization message. Step 615 is executed by the processing unit 210. The client synchronization message comprises the new local networking data (determined at step 605) and the local version number L2 corresponding to the last entry in the updated (at step 610) local topology table.

Following is a simplified exemplary version of the updated local topology table when the new local networking data generate two new entries.

| ... | ... |
| ... | ... |
| Local networking data | L1 |
| New local networking data (part 1) | L2 |
| New local networking data (part 2) | L2' |

In this case, at step 615, the client synchronization message comprises the new local networking data (part 1 and part 2) and the local version number L2' (greater than L2) corresponding to the last entry in the updated local topology table.

The server topology table and the associated server version number have been described previously in relation to FIG. 5. The server topology table stored in the memory 220 is initially empty and has an initial server version number (e.g. 0). Each iteration of steps 625, 630 and 635 of the method 600 populates the server topology table and updates the associated server version number.

In the following, we consider a stage (after one or more iteration of steps 625, 630 and 635) where the server topology table comprises a plurality of entries and a corresponding server version number S1.

Following is a simplified exemplary version of the server topology table with details provided only for the last entry.

| ... |
| ... |
| Server networking data |

The method 600 comprises the step 625 of receiving from the topology server 500 via the communication interface 230 a server synchronization message. Step 625 is executed by the processing unit 210. The server synchronization message comprises new server networking data and a new server version number S2 greater than S1.

The method 600 comprises the step 630 of updating the server topology table by adding one or more new entry to the server topology table. Step 630 is executed by the processing unit 210. The one or more new entry comprises the new server networking data.

Following is a simplified exemplary version of the updated server topology table when the new server networking data generate a single new entry.

| ... |
| ... |
| Server networking data |
| New server networking data |

Following is a simplified exemplary version of the updated server topology table when the new server networking data generate two new entries.

| ... |
| ... |
| Server networking data |
| New server networking data (part 1) |
| New server networking data (part 2) |

The method 600 comprises the step 635 of updating the server version number stored in the memory 220 from its current value S1 to the new value S2 (received at step 625). Step 635 is executed by the processing unit 210.

Steps 625-635 are executed independently of steps 605-615. Thus, the steps 625-635 and 605-615 may be executed sequentially or concurrently.

The client synchronization message sent at step 615 is sent at the initiative of the leaf switch 200A or upon request from the topology server 500. Furthermore, an acknowledgement of a proper reception of the client synchronization message may be sent by the topology server 500 to the leaf switch 200A. Failure to receive the acknowledgement may be considered as one of the pre-defined events mentioned in step 650.

Similarly, the server synchronization message received at step 625 is sent at the initiative of the topology server 500 or upon request from the leaf switch 200A. Failure to receive an expected server synchronization message may also be considered as one of the pre-defined events mentioned in step 650.

Following is a description of a mechanism for recovering from a loss of synchronization between the leaf switch 200A and the topology server 500.

The method 600 comprises the step 650 of determining that a pre-defined event has occurred. Step 650 is executed by the processing unit 210. The pre-defined event is an event preventing the exchange of the synchronization messages between the leaf switch 200A and the topology server 500 at steps 615 and 625. Examples of pre-defined events include a failure of a network connection between the leaf switch 200A and the topology server 500, a reboot of the leaf switch 200A, etc.

The method 600 comprises the step 655 of sending to the topology server 500 via the communication interface 230 a join message. Step 655 is executed by the processing unit 210. The join message comprises a current server version number (e.g. S3) corresponding to the server topology table currently stored in the memory 220. Step 655 is performed after the leaf switch 200A has recovered from the occurrence of the pre-defined event that was detected at step 650 (e.g. restoration of the network connection between the leaf switch 200A and the topology server 500, reboot of the leaf switch 200A completed, etc.).

The method 600 comprises the step 660 of receiving from the topology server 500 via the communication interface 230 a server synchronization message. Step 660 is executed by the processing unit 210. The server synchronization message comprises new server networking data, a new server version number S4, and an estimated local version number L3. S4 is greater than S3.

The method 600 comprises the step 665 of updating the server topology table by adding one or more new entry to the server topology table. Step 665 is executed by the processing unit 210. The one or more new entry comprises the new server networking data received at step 660.

Following is a simplified exemplary version of the updated server topology table when the new server networking data generate a single new entry. The server networking data currently stored in the server topology table (before the occurrence of steps 650-655-660) are simply referred to as "server networking data".

| |
|---|
| . . . |
| . . . |
| Server networking data |
| New server networking data |

Following is a simplified exemplary version of the updated server topology table when the new server networking data generate two new entries.

| |
|---|
| . . . |
| . . . |
| Server networking data |
| New server networking data (part 1) |
| New server networking data (part 2) |

The method 600 comprises the step 670 of updating the server version number from the current server version number S3 (sent at step 655) to the new server version number S4 (received at step 660). Step 670 is executed by the processing unit 210.

The method 600 comprises the step 675 of determining that the estimated local version number L3 (received at step 660) is lower than a current local version number L4 corresponding to the last entry in the local topology table currently stored in the memory 220. Step 675 is executed by the processing unit 210.

For example, before the occurrence of steps 650-655-660, a simplified exemplary version of the local topology table is as follows.

| | |
|---|---|
| . . . | . . . |
| . . . | . . . |
| Local networking data | L3 |
| . . . | . . . |
| Local networking data | L4 |

The local version number L3 and the corresponding local networking data have been transmitted by the leaf switch 200A and received by the topology server 500 (as per step 615). However, one or more following version number (e.g. L4) and the corresponding local networking data have not been transmitted by the leaf switch 200A and/or not received by the topology server 500 (e.g. because of the occurrence of the pre-defined event detected at step 650). Thus, the leaf switch 200A and the topology server 500 are de-synchronized.

The method 600 comprises the step 680 of sending to the topology server 500 via the communication interface 230 a client synchronization message. Step 680 is executed by the processing unit 210. The client synchronization message comprises local networking data comprised in one or more entry of the local topology table having a respective version number greater than L3 (received at step 660). The client synchronization message also comprises the current local version number L4.

Following step 680, the leaf switch 200A and the topology server 500 are re-synchronized. The method 600 reverts back to its standard mode of operation, by performing steps 605-615 and/or steps 625-635.

In an alternative use case, the server synchronization message received at step 660 does not contain new server networking data, but contains the estimated local version number L3 (and optionally the new server version number S4, which is equal to S3). This use case occurs when the topology server 500 determines that the leaf switch 200A is synchronized with the topology server 500 with respect to the server networking data, so that no new server networking data need to be transmitted from the topology server 500 to the leaf switch 200A. Consequently, steps 665 and 670 are not performed. This use case is not represented in FIG. 7C for simplification purposes.

In another alternative use case, the estimated local version number L3 (contained in the server synchronization message received at step 660) is equal to the current local version number L4 corresponding to the last entry in the local topology table currently stored in the memory 220. In this case, the leaf switch 200A determines that the topology server 500 is synchronized with the leaf switch 200A with respect to the local networking data, so that no new local networking data need to be transmitted from the leaf switch 200A to the topology server 500 (as per step 680). Consequently, steps 675 and 680 are not performed (no client synchronization message is sent). This use case is not represented in FIG. 7D for simplification purposes. Alternatively, a client synchronization message is sent with only the current local version number L4, which is equal to the estimated local version number L3 in this case.

The client synchronization messages sent at steps 615 and 680, and the join message sent at step 655, contain an identifier of the leaf switch 200A. This identifier is unique among all the leaf switches which send these messages to the topology server 500, allowing the topology server 500 to identify a given leaf switch (e.g. 200A) among all the leaf switches (e.g. 200A, 200B, 200C, 200D, etc.). Examples of identifier include an IP address, a MAC address, an identifier generated by the leaf switch, etc.

The terminology "table" used in reference to the local topology table and the server topology table shall be interpreted broadly, as including any type of data structure capable of storing the information contained in the local topology table and the server topology table. Furthermore, the same data structure may be used for storing the information contained in the local topology table and the server topology table When an entry in the local topology table becomes obsolete (e.g. the IP address of a remote node has changed), the entry is removed from the local topology table. The leaf switch (e.g. 200A) storing the local topology table informs (e.g. via a client synchronization message) the topology server 500 of the obsolete information. The topology server 500 updates its global topology table by removing the obsolete information. The topology server 500 informs the other leaf switches (e.g. 200B, 200C and 200D via server synchronization messages) of the obsolete information. The other leaf switches respectively update their server topology tables by removing the obsolete information.

Although the method 600 has been described as being implemented by a leaf switch of a fabric, the method 600 may also be implemented by other types of computing devices interacting with a topology server according to the steps of the method 600.

An additional resynchronization mechanism can be used between the topology server 500 and the clients (e.g. leaf switches 200A, 200B, 200C and 200D). When the topology server 500 starts, the topology server 500 randomly generates a number referred to as the server generation number, which is shared with the clients. If the topology server 500 restarts, the topology server 500 generates a new server generation number. Following the determination that a pre-defined event has occurred at step 650, the server generation number is used to determine that the pre-defined event is a restart of the topology server 500. If there is a mismatch between the server generation number currently stored by the clients and the server generation number currently used by the topology server 500, a determination is made that the topology server 500 has restarted and a full resynchronization of the topology server 500 and the clients is performed (where all the networking data respectively collected by the clients and the topology server 500 are exchanged). The first time a given client connects to the topology server 500, the given client uses a reserved server generation number that indicates that the given client has never connected with the topology server 500. A full synchronization is performed between the given client and the topology server 500 (where all the networking data respectively collected by the given client and the topology server 500 are exchanged).

Global Topology Table Management

Figure 8:
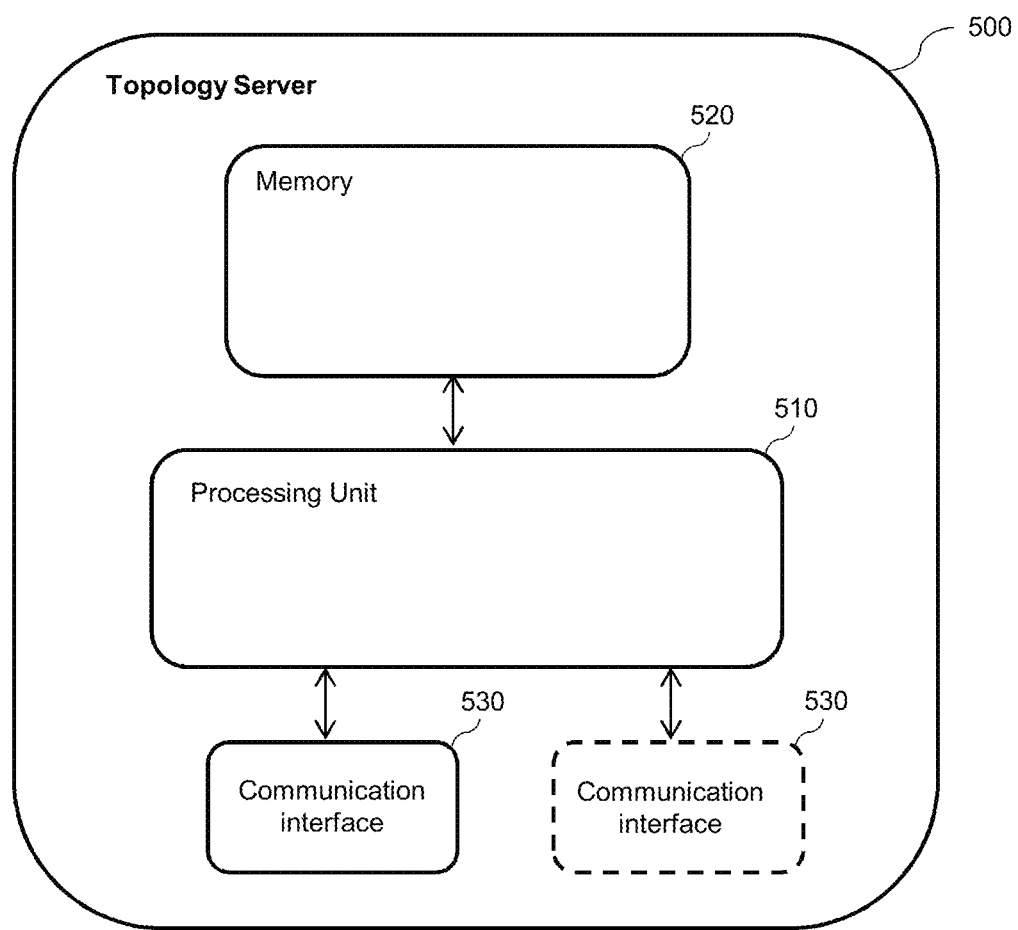
FIG. 8 illustrates a schematic representation of the topology server represented in FIG. 5.
Figure 9A:
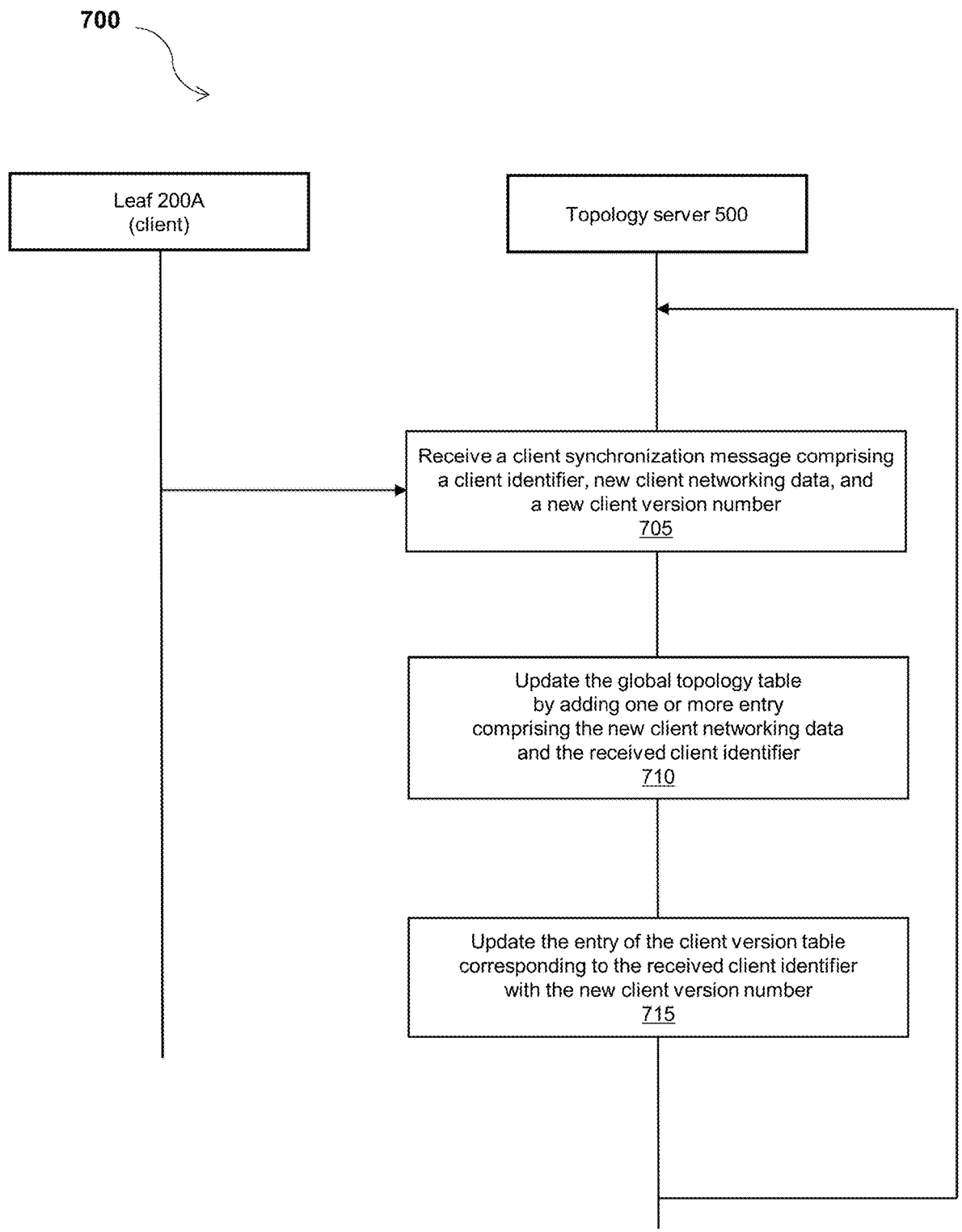
FIGS. 9A, 9B, 9C and 9D represent a method for performing synchronization and resynchronization of networking information between the topology server and the leaf switches represented in FIG. 5.
Figure 9B:
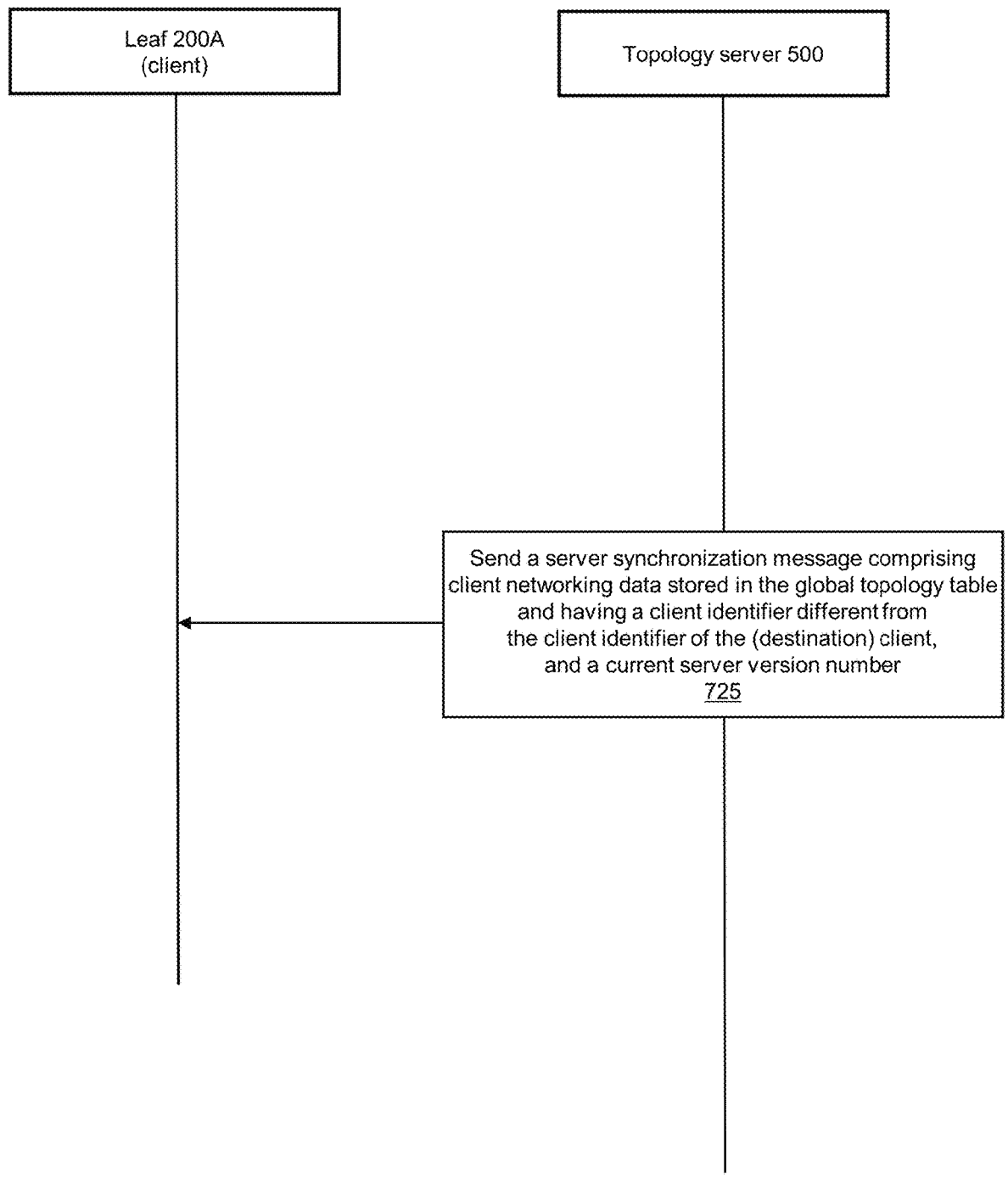
Figure 9C:
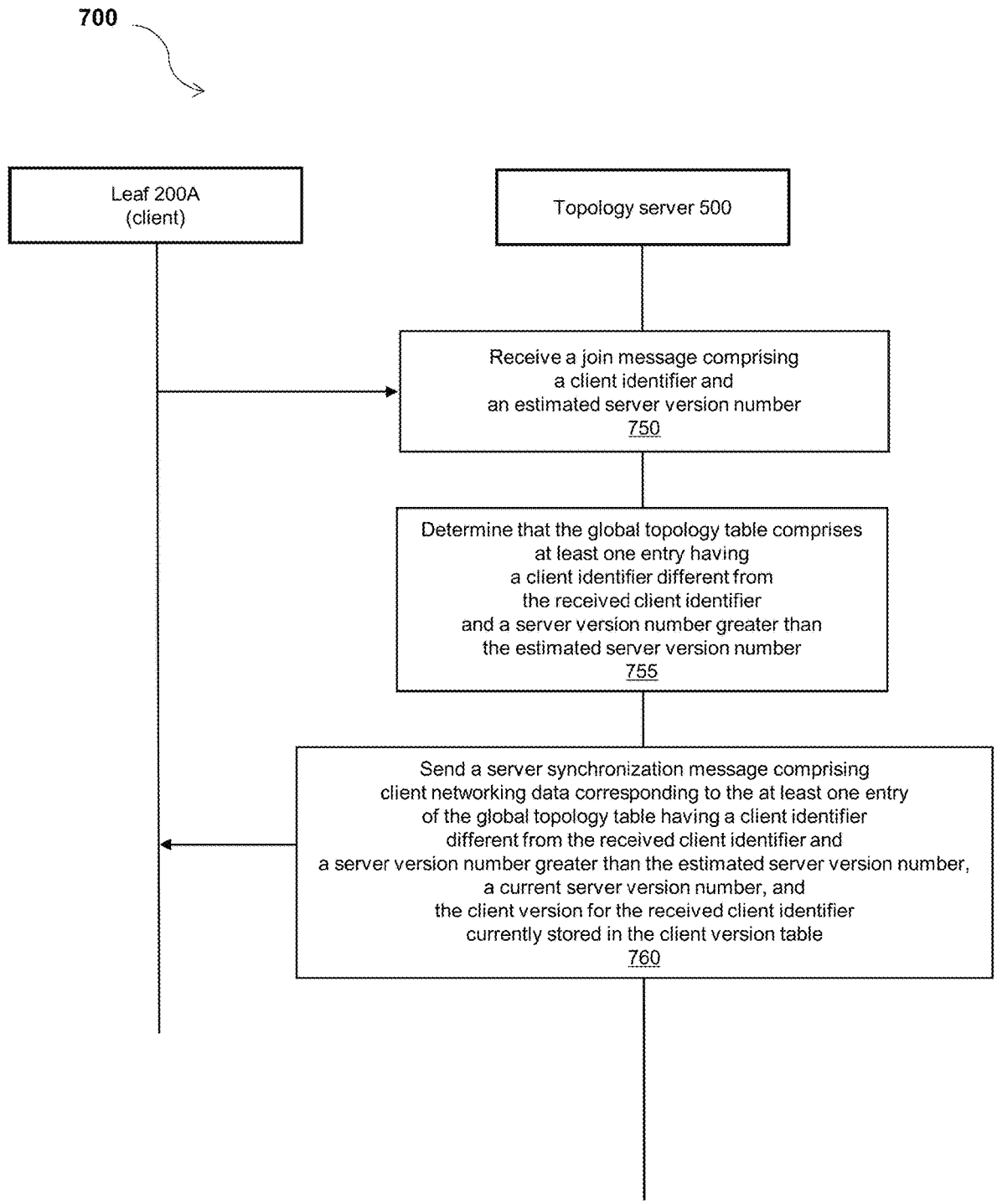
Figure 9D:
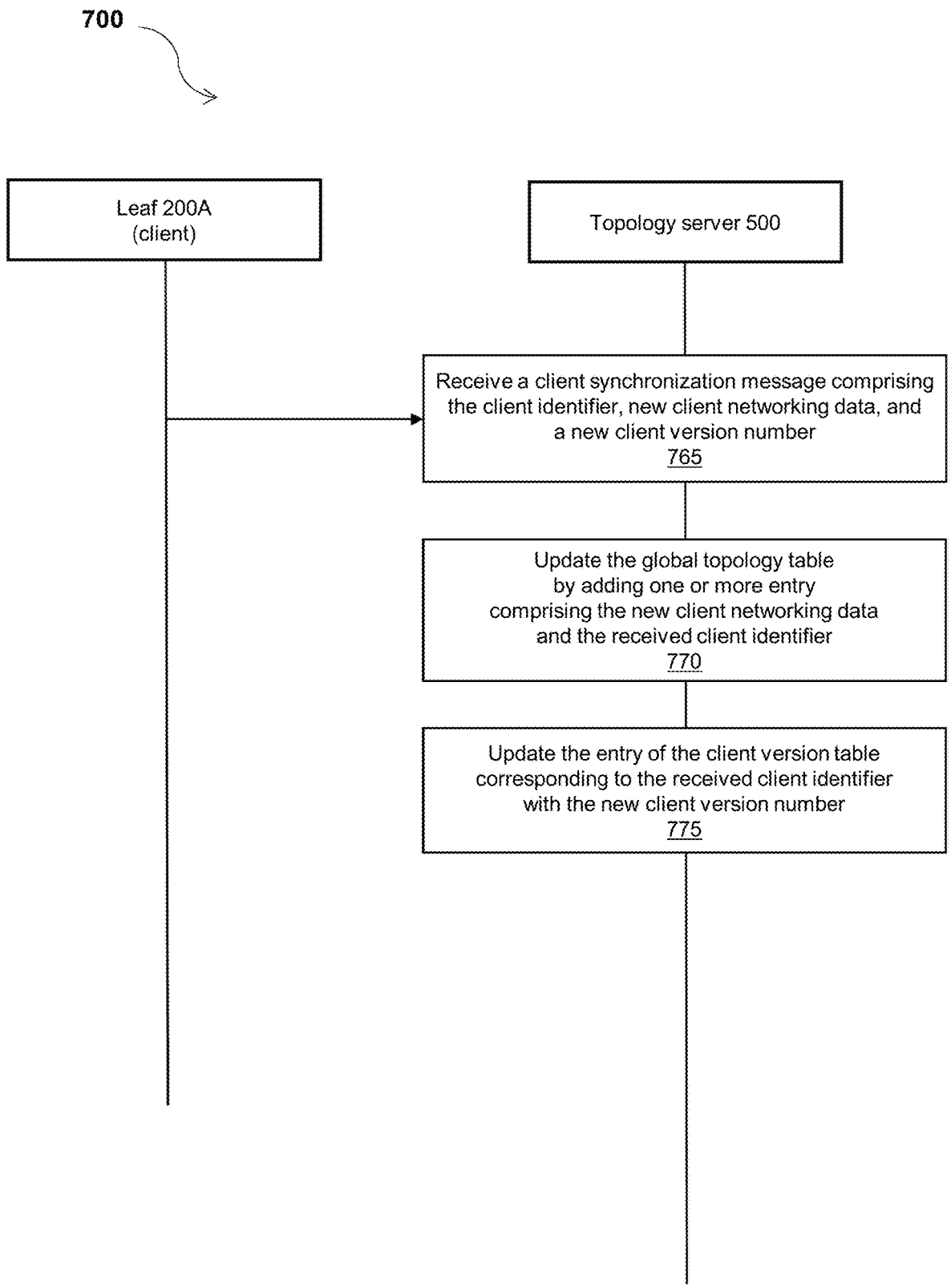

Referring now concurrently to FIGS. 5 and 8, a generic functional representation of the topology server 500 is represented in FIG. 8.

The topology server 500 comprises a processing unit 510, memory 520, and at least one communication interface 530.

The topology server 500 may comprise additional components (not represented in FIG. 8 for simplification purposes). For example, the topology server 500 may include a user interface and/or a display.

The processing unit 510 comprises one or more processors (not represented in FIG. 8) capable of executing instructions of a computer program. Each processor may further comprise one or several cores.

The memory 520 stores instructions of computer program(s) executed by the processing unit 510, data generated by the execution of the computer program(s) by the processing unit 510, data received via the communication interface(s) 530, etc. Only a single memory 520 is represented in FIG. 8, but the topology server 500 may comprise several types of memories, including volatile memory (such as Random Access Memory (RAM)) and non-volatile memory (such as a hard drive, Erasable Programmable Read-Only Memory (EPROM), Electrically-Erasable Programmable Read-Only Memory (EEPROM), etc.).

Each communication interface 530 allows the topology server 500 to exchange data with other devices. Examples of communication interfaces 530 include standard (electrical) Ethernet ports, fiber optic ports, ports adapted for receiving Small Form-factor Pluggable (SFP) units, etc. The communication interfaces 530 are generally of the wireline type; but may also include some wireless ones (e.g. a Wi-Fi interface). The communication interface 530 comprises a combination of hardware and software executed by the hardware, for implementing the communication functionalities of the communication interface 530. Alternatively, the combination of hardware and software for implementing the communication functionalities of the communication interface 530 is at least partially included in the processing unit 510.

Referring now concurrently to FIGS. 5, 8, 9A, 9B, 9C and 9D, a method 700 for performing synchronization and resynchronization of networking information with a plurality of leaf switches is illustrated in FIGS. 9A-D. The steps of the method 700 are performed by the topology server 500. For illustration purposes, the method 700 will be described with reference to the leaf switch 200A represented in FIG. 5. However, the topology server 500 interacts with a plurality of leaf switches (e.g. 200A, 200B, 200C and 200D) when performing the method 700.

In the rest of the description, the leaf switches interacting with the topology server 500 will also be referred to as clients of the topology server 500.

A dedicated computer program has instructions for implementing the steps of the method 700. The instructions are comprised in a non-transitory computer program product (e.g. the memory 520) of the topology server 500. The instructions, when executed by the processing unit 510 of the topology server 500, provide for performing synchronization and resynchronization of networking information with a plurality of leaf switches. The instructions are deliverable to the topology server 500 via an electronically-readable media such as a storage media (e.g. CD-ROM, USB key, etc.), or via communication links (e.g. via a communication network through one of the communication interfaces 530).

The global topology table and the client version table have been described previously in relation to FIG. 5. The global topology table and the client version table stored in the memory 520 are initially empty. Each iteration of steps 705, 710 and 715 of the method 700 populates the global topology table and the client version table.

In the following, we consider a stage (after one or more iteration of steps 705, 710 and 715) where the global topology table comprises a plurality of entries, the last entry in the global topology table having a server version number S1. The client version table also comprises a plurality of entries.

Following is a simplified exemplary version of the global topology table with details provided only for the last entry. The last entry includes client networking data previously received from leaf switch 200A, the unique client identifier of leaf switch 200A (LEAF_A for illustration purposes), and the corresponding server version number S1.

| ... | ... | ... |
|---|---|---|
| ... | ... | ... |
| Client networking data | LEAF_A | S1 |

Following is a simplified exemplary version of the client version table with details provided only for the first two entries. The first entry includes the unique client identifier of leaf switch 200A (LEAF_A), and its corresponding client version number A_L1. The second entry includes the unique client identifier of leaf switch 200B (LEAF_B), and its corresponding client version number B_L1.

| LEAF_A | A_L1 |
|---|---|
| LEAF_B | B_L1 |
| ... | ... |

The method 700 comprises the step 705 of receiving from a given client (e.g. leaf switch 200A) among the plurality of clients (e.g. among leaf switches 200A, 200B, 200C and 200D) via the communication interface 530 a client synchronization message. Step 705 is executed by the processing unit 510. The client synchronization message comprises the client identifier of the given client (e.g. LEAF_A), new client networking data, and a new client version number (e.g. A_L2). Step 705 corresponds to step 615 of the method 600 illustrated in FIG. 7A.

The method 700 comprises the step 710 of updating the global topology table by adding one or more new entry to the global topology table. Step 710 is executed by the processing unit 510. The one or more new entry comprises the new client networking data, the client identifier (e.g. LEAF_A) of the client which sent the client synchronization message, and respective increasing server version numbers greater than S1. The last entry in the updated global topology table has a server version number S2 (greater than S1).

Following is a simplified exemplary version of the updated global topology table when the new client networking data generate a single new entry.

| ... | ... | ... |
|---|---|---|
| ... | ... | ... |
| Client networking data | LEAF_A | S1 |
| New client networking data | LEAF_A | S2 |

Following is a simplified exemplary version of the updated global topology table when the new client networking data generate two new entries.

| ... | ... | ... |
|---|---|---|
| ... | ... | ... |
| Client networking data | LEAF_A | S1 |
| New client networking data (part 1) | LEAF_A | S2 |
| New client networking data (part 2) | LEAF_A | S2' |

Following is a simplified exemplary version of the updated global topology table when the new client networking data generate a single new entry and the last entry before the update corresponds to leaf switch 200B instead of 200A.

| ... | ... | ... |
|---|---|---|
| ... | ... | ... |
| Client networking data | LEAF_B | S1 |
| New client networking data | LEAF_A | S2 |

The method 700 comprises the step 715 of updating the entry of the client version table corresponding to the client identifier (e.g. LEAF_A) of the client which sent the client synchronization message, with the new client version number (e.g. A_L2) received at step 705. A_L2 is greater than A_L1.

Following is a simplified exemplary version of the updated client version table.

| LEAF_A | A_L2 |
|---|---|
| LEAF_B | B_L1 |
| ... | ... |

At each iteration of steps 705-710-715, the client synchronization message received at step 705 originates from one among the plurality of leaf switches (e.g. 200A, 200B, 200C and 200D) interacting with the topology server 500. The previous examples have been provided with a client synchronization message originating from leaf switch 200A, but could be generalized to a client synchronization message originating from any leaf switch.

Each time the topology server 500 receives a new client synchronization message from a given client (e.g. leaf switch 200A), the topology server 500 sends a server synchronization message to the other clients (e.g. leaf switches 200B, 200C and 200D) to forward the new client networking data received from the given client to the other clients.

Alternatively, the topology server 500 waits until it receives a plurality of new client synchronization messages (from the same or different clients), before sending server synchronization messages to the clients for dispatching the new client networking data received via the new client synchronization messages. A given client (e.g. leaf switch 200A) only receives server synchronization message(s) with new client networking data originating from other clients (e.g. leaf switches 200B, 200C and 200D). For example, the server synchronization messages are sent at regular intervals (e.g. every 30 seconds), and only if needed (if one or more new client synchronization message has been received).

The method 700 comprises the step 725 of sending to a given client (e.g. leaf switch 200A) via the communication interface 530 a server synchronization message. Step 725 is executed by the processing unit 510. The server synchronization message comprises client networking data stored in the global topology table and corresponding to one or more client different from the given client, and a current server version number. For instance, the current server version number corresponds to the last entry in the global topology table currently stored in the memory 520. Step 725 corresponds to step 625 of the method 600 illustrated in FIG. 7B.

As mentioned previously, each time an occurrence of step 705 is performed, one or more corresponding occurrence of step 725 is performed for sending one or more server synchronization message for dispatching the new networking data received at step 705 from one among the leaf switches (e.g. 200A) to the other leaf switches (e.g. 200B, 200C and 200D).

Alternatively, as mentioned previously, one or more occurrence of step 725 is performed after several occurrences of step 705 have been performed, for dispatching one or more server synchronization message for dispatching the new networking data received at steps 705 from one or more among the leaf switches, to respective leaf switches which are respectively not aware of at least some of the new networking data.

Following is a simplified exemplary version of the updated global topology table after reception of a client synchronization message (as per step 705) from leaf switch 200B comprising new client networking data.

| ... | ... | ... |
|---|---|---|
| ... | ... | ... |
| Client networking data | LEAF_B | S1 |
| Client networking data | LEAF_A | S2 |
| New client networking data | LEAF_B | S3 |

Although not represented for simplification purposes, the entry corresponding to leaf switch 200B in the client version table is also updated with a new client version number (received at 705), as previously detailed with reference to step 715. A server synchronization message is sent as per step 725 to leaf switch 200A (as well as 200C and 200D) with the new client networking data and the server version number S3.

Following is another simplified exemplary version of the updated global topology table after reception of a client synchronization message (as per step 705) from leaf switch 200B comprising new client networking data which generate two entries in the updated global topology table.

| ... | ... | ... |
|---|---|---|
| ... | ... | ... |
| Client networking data | LEAF_B | S1 |
| Client networking data | LEAF_A | S2 |
| New client networking data (part 1) | LEAF_B | S3 |
| New client networking data (part 2) | LEAF_B | S4 |

Although not represented for simplification purposes, the entry corresponding to leaf switch 200B in the client version table is also updated with a new client version number (received at step 705), as previously detailed with reference to step 715. A server synchronization message is sent as per step 725 to leaf switch 200A (as well as 200C and 200D) with the new client networking data (part 1 and part 2) and the server version number S4.

Following is a simplified exemplary version of the updated global topology table after reception of a first client synchronization message (as per step 705) from leaf switch 200B comprising new client networking data and reception of a second client synchronization message (as per step 705) from leaf switch 200C comprising new client networking data.

| ... | ... | ... |
|---|---|---|
| ... | ... | ... |
| Client networking data | LEAF_B | S1 |
| Client networking data | LEAF_A | S2 |
| New client networking data (Leaf B) | LEAF_B | S3 |
| New client networking data (Leaf C) | LEAF_C | S4 |

Although not represented for simplification purposes, the entries corresponding to leaf switches 200B and 200C in the client version table are also updated with respective new client version numbers (received at step 705), as previously detailed with reference to step 715.

A server synchronization message is sent as per step 725 to leaf switch 200A (as well as 200D) with the new client networking data (from leaf switches B and C) and the server version number S4. A server synchronization message is also sent as per step 725 to leaf switch 200B with the new client networking data from leaf switch C and the server version number S4. A server synchronization message is also sent as per step 725 to leaf switch 200C with the new client networking data from leaf switch B and the server version number S4.

In all the previous examples, it is assumed that the leaf switches were previously updated (when appropriate) with previously sent server synchronization messages up to server version number S2.

Following is a description of a mechanism for recovering from a loss of synchronization between the leaf switch 200A and the topology server 500.

The method 700 comprises the step 750 of receiving from the leaf switch 200A via the communication interface 530 a join message. Step 750 is executed by the processing unit 510. The join message comprises the client identifier (LEAF_A) of the leaf switch 200A and an estimated server version number (e.g. S4). Step 750 corresponds to step 655 of the method 600 illustrated in FIG. 7C.

The method 700 comprises the step 755 of determining that the global topology table comprises at least one entry having a client identifier different from the client identifier (LEAF_A) of the leaf switch 200A and a server version number greater than the estimated server version number (e.g. S4).

Following is a simplified exemplary version of the global topology table stored in the memory 520 upon reception of the join message at step 750.

| ... | ... | ... |
|---|---|---|
| ... | ... | ... |
| Client networking data | LEAF_B | S1 |
| Client networking data | LEAF_A | S2 |
| Client networking data | LEAF_B | S3 |
| Client networking data | LEAF_C | S4 |
| Updated client networking data | LEAF_C | S5 |
| Updated client networking data | LEAF_B | S6 |

Leaf switch 200A is not aware of the new entries in the global topology table corresponding to the server version numbers S5 and S6, which are greater than the estimated server version number S4.

The method 700 comprises the step 760 of sending to the leaf switch 200A via the communication interface 530 a server synchronization message. Step 760 is executed by the processing unit 510. Step 760 corresponds to step 660 of the method 600 illustrated in FIG. 7C.

The server synchronization message comprises client networking data corresponding to the at least one entry of the global topology table having a client identifier different from the client identifier (LEAF_A) of the leaf switch 200A and a server version number (e.g. S5 and S6) greater than the estimated server version number (e.g. S4), a current server version number, and the client version of the leaf switch 200A currently stored in the client version table. In an exemplary implementation, the current server version number corresponds to the last entry (e.g. S6) in the global topology table currently stored in the memory 520.

Based on the previous exemplary global topology table, the server synchronization message comprises the updated client networking data corresponding to the respective server version numbers S5 and S6. The current server version number sent in the server synchronization message is S6.

Following is a simplified exemplary version of the client version table currently stored in the memory 520 upon reception of the join message at step 750.

| LEAF_A | A_L2 |
|--------|------|
| LEAF_B | B_L1 |
| ...    | ...  |

The client version of the leaf switch 200A (currently stored in the client version table) sent in the server synchronization message at step 760 is A_L2.

The method 700 comprises the step 765 of receiving from the leaf switch 200A via the communication interface 530 a client synchronization message. Step 765 is executed by the processing unit 510. Step 765 corresponds to step 680 of the method 600 illustrated in FIG. 7D; and is similar to step 705.

As mentioned previously, the client synchronization message comprises the client identifier of the leaf switch 200A (LEAF_A), new client networking data, and a new client version number.

The method 700 comprises the step 770 of updating the global topology table by adding one or more new entry to the global topology table. Step 770 is executed by the processing unit 510. Step 770 is similar to step 710.

As mentioned previously, the one or more new entry added to the global topology table comprises the new client networking data received at step 765, the client identifier (LEAF_A) of the leaf switch 200A, and respective increasing server version numbers.

Following is a simplified exemplary version of the updated global topology table when the new client networking data generate a single new entry (with the new client networking data and a server version number S7 greater than S6).

| ... | ... | ... |
|-----|-----|-----|
| ... | ... | ... |
| Client networking data | LEAF_B | S1 |
| Client networking data | LEAF_A | S2 |
| Client networking data | LEAF_B | S3 |
| Client networking data | LEAF_C | S4 |
| Client networking data | LEAF_C | S5 |
| Client networking data | LEAF_B | S6 |
| New client networking data | LEAF_A | S7 |

Following is a simplified exemplary version of the updated global topology table when the new client networking data generate two new entries (with the new client networking data and respective increasing server version number S7 and S8 greater than S6).

| ... | ... | ... |
|-----|-----|-----|
| ... | ... | ... |
| Client networking data | LEAF_B | S1 |
| Client networking data | LEAF_A | S2 |
| Client networking data | LEAF_B | S3 |
| Client networking data | LEAF_C | S4 |
| Client networking data | LEAF_C | S5 |
| Client networking data | LEAF_B | S6 |
| New client networking data (part 1) | LEAF_A | S7 |
| New client networking data (part 2) | LEAF_A | S8 |

The method 700 comprises the step 775 of updating the entry of the client version table corresponding to the client identifier (LEAF_A) of the leaf switch 200A, with the new client version number received at step 765. Step 775 is similar to step 715.

Following is a simplified exemplary version of the client version table stored in the memory 520 before performing step 775.

| LEAF_A | A_L2 |
|--------|------|
| LEAF_B | B_L1 |
| ...    | ...  |

Following is a simplified exemplary version of the updated client version table (after performing step 775) with the new client version number A_L3 received at step 765 (which is greater than A_L2).

| LEAF_A | A_L3 |
|--------|------|
| LEAF_B | B_L1 |
| ...    | ...  |

Following the sequence of steps 750-755-760-765-770-775, the leaf switch 200A and the topology server 500 are re-synchronized. The method 700 reverts back to its standard mode of operation, by performing steps 705-710-715 and/or 725.

In an alternative use case, after receiving the join message at step 750, the processing unit 510 determines that the global topology table does not comprise an entry having a client identifier different from the client identifier (LEAF_A) of the leaf switch 200A and a server version number greater than the estimated server version number received in the join message. The processing unit 510 sends a server synchronization message which does not contain client networking data, but contains the client version of the leaf switch 200A currently stored in the client version table. Optionally, the server synchronization message also comprises the current server version number (e.g. the server version number of the last entry in the global topology table). This use case is not represented in FIG. 9C for simplification purposes.

In another alternative use case, the new client version number (e.g. L3) contained in the client synchronization message received at step 765 is equal to the current client version number (e.g. L2) of the leaf switch 200A in the client version table currently stored in the memory 520. In this case, the topology server 500 and the leaf switch 200A are synchronized, and steps 770 and 775 are not performed. This use case is not represented in FIG. 9D for simplification purposes. In this use case, the leaf switch 200A may also simply not send a client synchronization message, so that steps 765, 770 and 775 are not performed.

The terminology "table" used in reference to the global topology table and the client version table shall be interpreted broadly, as including any type of data structure capable of storing the information contained in the global topology table and the client version table. Furthermore, the same data structure may be used for storing the information contained in the global topology table and the client version table.

The method 700 has been described with reference to leaf switch 200A for illustration purposes. However, the method 700 applies to any of the leaf switches (e.g. 200A, 200B, 200C and 200D) interacting with the topology server 500. Thus, the topology server 500 receives client synchronization messages as per step 705 from a plurality of leaf switches, and sends server synchronization messages as per step 725 to the plurality of leaf switches. Furthermore, the topology server 500 may receive a join message as per step 750 from any one among the plurality of leaf switches, send a corresponding server synchronization message as per step 760 to the any one among the plurality of leaf switches, and may receive a corresponding client synchronization message as per step 760 from the any one among the plurality of leaf switches.

As mentioned previously, when an entry in the local topology table of a leaf switch becomes obsolete (e.g. the IP address of a remote node has changed), the entry is removed from the local topology table. The leaf switch (e.g. 200A) storing the local topology table informs (e.g. via a client synchronization message) the topology server 500 of the obsolete information. The topology server 500 updates its global topology table by removing the obsolete information. The topology server 500 informs the other leaf switches (e.g. 200B, 200C and 200D via server synchronization messages) of the obsolete information. The other leaf switches respectively update their server topology tables by removing the obsolete information.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A server comprising:
   memory storing:
      a global topology table comprising a plurality of entries, each entry comprising client networking data, a unique client identifier of one among a plurality of clients, and a unique server version number, the server version numbers increasing from a first value corresponding to a first entry in the global topology table to a last value S1 corresponding to a last entry in the global topology table; and
      a client version table comprising one entry for each one among the plurality of clients, each entry comprising the unique client identifier of one among the plurality of clients and a corresponding client version number;
   a communication interface; and
   one or more processor executing instructions to:
      receive from a given client among the plurality of clients via the communication interface a client synchronization message, the client synchronization message comprising the client identifier of the given client, new client networking data, and a new client version number;
      update the global topology table by adding one or more new entry to the global topology table, the one or more new entry comprising the new client networking data, the client identifier of the given client, and respective increasing server version numbers greater than S1;
      update the entry of the client version table corresponding to the client identifier of the given client with the new client version number; and
      send to the given client via the communication interface a server synchronization message, the server synchronization message comprising client networking data stored in the global topology table and having a client identifier different from the client identifier of the given client, the server synchronization message further comprising a current server version number.

2. The server of claim 1, wherein the current server version number corresponds to the last entry in the global topology table currently stored in the memory.

3. The server of claim 1, wherein the one or more processor receives client synchronization messages from several among the plurality of clients and respectively updates the global topology table and the client version table based on the received client synchronization messages.

4. The server of claim 1, wherein the one or more processor sends server synchronization messages to several among the plurality of clients.

5. The server of claim 1, wherein the client networking data comprise information related to a remote node and an identifier of an intermediate node.

6. The server of claim 5, wherein the information related to the remote node comprises a Media Access Control (MAC) address of the remote node, an Internet Protocol (IP) address of the remote node, a MAC address and an IP address of the remote node, and a tuple identifying a network connection of the remote node.

7. The server of claim 5, wherein the identifier of the intermediate node consists of an IP address or a MAC address of the intermediate node.

8. The server of claim 1, wherein the unique client identifier of a client consists of a MAC address of the client, an IP address of the client or a unique identifier generated by the client.

9. A method implemented by a server for performing synchronization of networking information with a client, the method comprising:
   storing in a memory of the server a global topology table comprising a plurality of entries, each entry comprising client networking data, a unique client identifier of one among a plurality of clients, and a unique server version number, the server version numbers increasing from a first value corresponding to a first entry in the global topology table to a last value S1 corresponding to a last entry in the global topology table;
   storing in the memory a client version table comprising one entry for each one among the plurality of clients, each entry comprising the unique client identifier of one among the plurality of clients and a corresponding client version number;
   receiving by a processing unit of the server from a given client among the plurality of clients via a communication interface of the server a client synchronization message, the client synchronization message comprising the client identifier of the given client, new client networking data, and a new client version number;
   updating by the processing unit the global topology table by adding one or more new entry to the global topology table, the one or more new entry comprising the new client networking data, the client identifier of the given client, and respective increasing server version numbers greater than S1;
   updating by the processing unit the entry of the client version table corresponding to the client identifier of the given client with the new client version number; and
   sending by the processing unit to the given client via the communication interface a server synchronization message, the server synchronization message comprising client networking data stored in the global topology table and having a client identifier different from the client identifier of the given client, the server synchronization message further comprising a current server version number.

10. A server comprising:
    memory storing:
        a global topology table comprising a plurality of entries, each entry comprising client networking data, a unique client identifier of one among a plurality of clients, and a unique server version number, the server version numbers increasing from a first value corresponding to a first entry in the global topology table to a last value corresponding to a last entry in the global topology table; and
        a client version table comprising one entry for each one among the plurality of clients, each entry comprising the unique client identifier of one among the plurality of clients and a corresponding client version number;
    a communication interface; and
    one or more processor executing instructions to:
        receive from a given client via the communication interface a join message, the join message comprising the client identifier of the given client and an estimated server version number S4;
        determine that the global topology table comprises at least one entry having a client identifier different from the client identifier of the given client and a server version number greater than the estimated server version number S4; and
        send to the given client via the communication interface a server synchronization message, the server synchronization message comprising client networking data corresponding to the at least one entry of the global topology table having a client identifier different from the client identifier of the given client and a server version number greater than the estimated server version number S4, a current server version number, and the client version of the given client currently stored in the client version table.

11. The server of claim 10, wherein the current server version number corresponds to the last entry in the global topology table currently stored in the memory.

12. The server of claim 10, wherein the one or more processor further:
    receives from the given client via the communication interface a client synchronization message, the client synchronization message comprising the client identifier of the given client, new client networking data, and a new client version number;
    updates the global topology table by adding one or more new entry to the global topology table, the one or more new entry comprising the new client networking data, the client identifier of the given client, and respective increasing server version numbers; and
    updates the entry of the client version table corresponding to the client identifier of the given client with the new client version number.

13. The server of claim 10, wherein the client networking data comprise information related to a remote node and an identifier of an intermediate node.

14. The server of claim 13, wherein the information related to the remote node comprises a Media Access Control (MAC) address of the remote node, an Internet Protocol (IP) address of the remote node, a MAC address and an IP address of the remote node, and a tuple identifying a network connection of the remote node.

15. The server of claim 13, wherein the identifier of the intermediate node consists of an IP address or a MAC address of the intermediate node.

16. The server of claim 10, wherein the unique client identifier of a client consists of a MAC address of the client, an IP address of the client or a unique identifier generated by the client.

17. A method implemented by a server for performing resynchronization of networking information with a client, the method comprising:
    storing in a memory of the server a global topology table comprising a plurality of entries, each entry comprising client networking data, a unique client identifier of one among a plurality of clients, and a unique server version number, the server version numbers increasing from a first value corresponding to a first entry in the global topology table to a last value corresponding to a last entry in the global topology table;
    storing in the memory a client version table comprising one entry for each one among the plurality of clients, each entry comprising the unique client identifier of one among the plurality of clients and a corresponding client version number;
    receiving by a processing unit of the server from a given client via the communication interface of the server a join message, the join message comprising the client identifier of the given client and an estimated server version number S4;
    determining by the processing unit that the global topology table comprises at least one entry having a client identifier different from the client identifier of the given client and a server version number greater than the estimated server version number S4; and
    sending by the processing unit to the given client via the communication interface a server synchronization message, the server synchronization message comprising client networking data corresponding to the at least one entry of the global topology table having a client identifier different from the client identifier of the given client and a server version number greater than the estimated server version number S4, a current server version number, and the client version of the given client currently stored in the client version table.

18. The method of claim 17, further comprising:
    receiving by the processing unit from the given client via the communication interface a client synchronization message, the client synchronization message comprising the client identifier of the given client, new client networking data, and a new client version number;
    updating by the processing unit the global topology table by adding one or more new entry to the global topology table, the one or more new entry comprising the new client networking data, the client identifier of the given client, and respective increasing server version numbers; and
    updating by the processing unit the entry of the client version table corresponding to the client identifier of the given client with the new client version number.

* * * * *